(12) United States Patent
Yabuta et al.

(10) Patent No.: US 6,313,221 B1
(45) Date of Patent: Nov. 6, 2001

(54) POWDER COATING OF EPOXY-ACRYLIC RESIN, POLYCARBOXYLIC ACID, CROSSLINKED PARTICLES AND LIQUID RESIN

(75) Inventors: Masami Yabuta, Ibaragi; Yutaka Harada; Atsushi Yamada, both of Hirakata; Yasuhiko Nakae, Kyoto; Kazuhiko Nishimura, Mitaka; Haruhiko Sato, Hirakata, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/579,892

(22) Filed: May 26, 2000

(30) Foreign Application Priority Data

| May 28, 1999 | (JP) | ................................ 11-150122 |
| Aug. 23, 1999 | (JP) | ................................ 11-235120 |
| Aug. 31, 1999 | (JP) | ................................ 11-246634 |
| Aug. 31, 1999 | (JP) | ................................ 11-246635 |
| Oct. 1, 1999 | (JP) | ................................ 11-281421 |

(51) Int. Cl.$^7$ .................................................. C08L 33/14
(52) U.S. Cl. ............................. 525/166; 525/57; 525/58; 525/117; 525/187; 525/208
(58) Field of Search .................... 525/114, 117, 525/57, 58, 166, 187, 208

(56) References Cited

U.S. PATENT DOCUMENTS

| 3,817,946 | | 6/1974 | Ree . | |
| 3,879,335 | * | 4/1975 | Storck et al. | ........................ 523/324 |
| 3,976,716 | | 8/1976 | Labana et al. | ........................ 526/271 |
| 4,027,066 | | 5/1977 | Victorius | ........................ 428/334 |
| 5,270,391 | * | 12/1993 | Miyazaki et al. | ..................... 525/194 |
| 5,270,416 | * | 12/1993 | Toman et al. | ........................ 524/904 |
| 5,610,269 | * | 3/1997 | Sato et al. | ............................. 528/499 |
| 5,719,212 | * | 2/1998 | Nakae et al. | ......................... 523/453 |
| 6,077,608 | * | 6/2000 | Barkac et al. | ..................... 428/411.1 |

FOREIGN PATENT DOCUMENTS

| 2240260A | | 3/1973 | (DE) . |
| 2441622A | | 3/1975 | (DE) . |
| 250183-B1 | * | 12/1987 | (EP) . |

OTHER PUBLICATIONS

Chemical Abstracts, vol. 86, No. 22, May 30, 1977.

"Modaflow Resin Flow Modifiers", online 1997, Solutia, Inc. XP002144683.

"Modaflow—resin flow modifiers, properties and uses", 2000, Solutia, Inc. St. Louis, XP002145539, table 1.

* cited by examiner

*Primary Examiner*—Robert E. L. Sellers
(74) *Attorney, Agent, or Firm*—Townsend & Banta

(57) ABSTRACT

A thermosetting powder coating composition prepared by a wet process, which contains a mixture comprising (a) an epoxy-containing acrylic resin, (b) a polycarboxylic acid compound curing agent, (c) fine crosslinked resin particles and/or (d) a resin that exists in the liquid form at room temperature.

6 Claims, No Drawings

POWDER COATING OF EPOXY-ACRYLIC RESIN, POLYCARBOXYLIC ACID, CROSSLINKED PARTICLES AND LIQUID RESIN

BACKGROUND OF THE INVENTION

1. Field of the Invention

The present invention relates to thermosetting powder coating compositions and curing agent compositions, and more particularly to thermosetting powder coating compositions excellent in storage stability and capable of providing coating films with excellent appearance and also to curing agent compositions for use in the thermosetting powder coating compositions.

2. Description of Related Art

Powder coatings which do not release organic solvents to an atmosphere have been widely noted as eco-friendly coatings.

Currently, the use of thermosetting powder coatings is popular in the powder coating field for their ability to provide coating films excellent in performances and physical properties. For their application to automotive bodies, the improvements in smoothness and appearance of resulting films have been demanded. One technique used to improve the film smoothness is the thick application of powder coatings. Another technique is the use of powder coatings prepared from the materials having low melt viscosity. While effective in achieving some improvements in smoothness and appearance of resulting films on automobile horizontal portions such as a hood and the like, these techniques have suffered from the problem. That is, the powder coatings applied onto automobile vertical portions such as doors and the like, when subsequently heated and melted, result in coating films which show a marked reduction in smoothness and appearance as a result of the occurrence of sagging.

The incorporation of fine crosslinked resin particles, called microgels, to prevent the occurrence of sagging is known in the solvent-borne coating field. For example, Japanese Patent Laying-Open Nos. Sho 49-97026 (1974) and Sho 60-250068 (1985) disclose techniques which contemplate to reduce sagging and accordingly improve film appearance by adding microgels to top coatings.

In the powder coating field, the use of powder coatings containing fine crosslinked resin particles is disclosed, for example, in Japanese Patent Laying-Open Nos. Sho 62-97026 (1987). However, such powder coatings are prepared by mixing dry fine particles of crosslinked resin under a solvent-free condition. During the mixing, the crosslinked resin particles are often caused to locally form agglomerates. This disturbs uniform distribution thereof to result in the unsatisfactory smoothness and appearance of obtaining coating films. In the case where a melt mixing process is added to precede the dry mixing process, a majority of fine particles of crosslinked resin are caused to deposit on surfaces of resulting powder coating particles. When such powder coating particles are applied and subsequently heated, the interaction is caused to occur between the fine crosslinked resin particles. This has led often to the insufficient smoothness and appearance of resulting coating films.

Powder coatings, when heated to melt, result in coating films. However, such coating films show the insufficient smoothness compared to those obtained from solvent-borne coatings. In order to improve the smoothness of resulting coating films, the melt viscosities of components contained in the powder coatings, i.e., the melt viscosity of raw material must be reduced to improve the fluidity thereof during melt.

One approach to lower the melt viscosity of raw material may be the use of low-melting point or low-molecular-weight substances for the raw material. While effective in improving the smoothness of resulting films, their use has also led to the reduction in storage properties, such as resistance to blocking and solid reaction. The difficulty has thus been to reconcile the storage stability of the coating composition and the smoothness of resulting film.

In Japanese Patent Laying-Open No. Hei 9-100414 (1997), a method is disclosed which produces thermosetting resin particles having a narrow particle size distribution by utilizing a wet process. Since the thermosetting resin particles are produced in an aqueous medium, their use has led to the improvement in one of storage properties, i.e., resistance to solid reaction. It has been unsatisfactory, however, to reconcile the blocking resistance of the powder coating composition and the smoothness of the obtaining film.

Among thermosetting powder coatings, acrylic-based coatings, when formed into films, provide excellent performances and physical properties. The resulting films however suffer from a problem of poor appearance, called a hazing phenomenon. This phenomenon is known to often occur when a large amount of polybasic acid is used as a curing agent. If the reduced amount of polybasic acid is used to suppress the occurrence of such a hazing phenomenon, the performances and physical properties of resulting films then become insufficient. Also, there exists no polybasic acid which can act to improve performances and physical properties of resulting films while controlling the occurrence of the hazing phenomenon, so far as we know.

SUMMARY OF THE INVENTION

It is a first object of the present invention to provide a thermosetting powder coating composition which, when applied and then heated, shows no occurrence of sagging to result in coating films with satisfactory smoothness and appearance.

It is a second object of the present invention to provide a thermosetting powder coating composition which has an excellent storage stability and can be formed into films with excellent smoothness.

It is a third object of the present invention to provide a curing agent composition which, when used as a curing agent for acrylic based powder coatings, serves to provide films which show no occurrence of hazing phenomenon, and also to provide a method of producing the curing agent composition.

In accordance with a first aspect of the invention, a thermosetting powder coating composition is provided which is prepared by a wet process from a formulation containing an epoxy-containing acrylic resin (a), a polycarboxylic acid compound curing agent (b) and fine crosslinked resin particles (c).

The above-stated wet process preferably includes the following steps:

1. The above-described formulation components are allowed to dissolve or disperse in an organic solvent to provide a raw material solution.
2. The raw material solution obtained in step 1 is added to an aqueous solution containing a water-soluble polymer that has a cloud point within the temperature range of 30–90° C. and mix them at a temperature below the cloud point to thereby prepare a suspension containing primary oil particles.

3. The suspension obtained in step 2 was heated to a temperature equal to or above the cloud point to form secondary oil particles and the organic solvent was distilled off to collect particles.

The aforementioned epoxy-containing acrylic resin (a) contains an epoxy-containing acrylic resin A and an epoxy-containing acrylic resin B. These acrylic resins A and B preferably satisfy the following relationships:

(1) $(SP_A-SP_B)$ is within the range of 0.2–1.5, where $SP_A$=solubility parameter of resin A and $SP_B$=solubility parameter of resin B;

(2) $Tg(A)-Tg(B) \geq 10°$ C., where $Tg(A)$=glass transition temperature of resin A and $Tg(B)$=glass transition temperature of resin B;

(3) $Tg(A)$ is within the range of 40–100° C. and $Tg(B)$ is within the range of 20–50° C.; and (4) A ratio in solid weight of resin A to B is within the range of 5/95–50/50.

The aforementioned formulation may further contain a resin (d) that exists in the liquid form at room temperature and preferably satisfies the following relationships:

(1) $(SP_B-SP_d)$ is within the range of 0.01–1.5, where $SP_d$ is solubility parameter of resin (d); and (2) A solids weight of the resin (d) is 5–70 parts, based on 100 parts of a total solids weight of the epoxy-containing acrylic resin (a) and resin (d).

In accordance with a second aspect of the present invention, a thermosetting powder coating composition is provided which is prepared by a wet process from a formulation containing an epoxy-containing acrylic resin (a), a polycarboxylic acid compound curing agent (b) and a resin (d) that exists in the liquid form at room temperature.

The above-stated wet process preferably includes the following steps:

1. A raw material solution is formed by allowing the above-described formulation to dissolve or disperse in an organic solvent.

2. The raw material solution obtained in step 1 is mixed with an aqueous solution containing a water-soluble polymer which shows a cloud point at a temperature within the range of 30–90° C. to prepare a suspension containing primary oil particles.

3. The suspension obtained in step 2 was heated to a temperature of not below the cloud point to prepare secondary oil particles while removing the organic solvent to collect particles.

The aforementioned epoxy-containing acrylic resin (a) may contain an epoxy-containing acrylic resin A and another epoxy-containing acrylic resin B. The formulation components preferably satisfies the following relationships:

(1) A number average molecular weight of resin A is in the range of 2,000–4,000;

(2) $Tg(A)$ is within the range of 40–100° C., where $Tg(A)$=glass transition temperature of resin A;

(3) $Tg(A)-Tg(B) \geq 10°$ C., where $Tg(B)$=glass transition temperature of resin B;

(4) $(SP_A-SP_B)$ is within the range of 0.2–1.5, where $SP_A$=solubility parameter of resin A and $SP_B$=solubility parameter of resin B;

(5) A solids amount of resin B is 50–95% by weight of the total solids of epoxy-containing acrylic resin (a);

(6) $(SP_B-SP_d)$ is within the range of 0.01–1.5, where $SP_d$=solubility parameter of resin (d); and (7) The solids amount of resin (d) is 5–70 parts by weight, based on 100 parts by weight of the total solids of the aforementioned epoxy-containing acrylic resin (a) and resin (d).

In accordance with a third aspect of the invention, a curing agent composition (b) is provided which contains a polycarboxylic acid compound (b-1) that exists in the crystalline solid form at room temperature, and a carboxylic acid compound (b-2) dissimilar in type to the polycarboxylic acid compound (b-1). Characteristically, the curing agent composition satisfies the following relationships:

(1) The curing agent composition (b) exists in the solid form at room temperature; and (2) A melting point of the curing agent composition (b), as determined by DSC (differential scanning calorimeter), is lower than a melting point of the polycarboxylic acid compound (b-1) or the carboxylic acid compound (b-2).

The melting point of the curing agent composition (b) is preferably within the 60–180° C. range.

Preferably, the melting point of the curing agent composition (b) is lower than the melting point of the polycarboxylic acid compound (b-1) and lower than the melting point of the carboxylic acid compound (b-2).

Preferably, a ratio in weight of the polycarboxylic acid compound (b-1) to carboxylic acid compound (b-2) is 50:50–99:1.

A multilayer film-forming method of the present invention includes the steps of:

applying a basecoat onto an undercoated and optionally intercoated substrate;

applying the powder coating composition of the present invention onto the basecoat; and heating the substrate carrying thereon the basecoat and powder coating layers.

A multilayer film of the present invention is the multilayer film prepared according to the above-described multilayer film-forming method.

BRIEF DESCRIPTION OF THE DRAWING

FIG. 1 is a graph showing an illustrative DSC absorption curve from the curing agent composition of the present invention.

DETAILED DESCRIPTION OF THE INVENTION

The term "room temperature", as used herein, refers to 25° C. The "solid form" means the state wherein a substance has definite volume and configuration. The "liquid form" means the state wherein a substance has a definite volume but does not have a definite configuration.

Thermosetting Powder Coating Composition

The thermosetting powder coating composition according to the first aspect of the invention is prepared by a wet process and contains, as raw material, an epoxy-containing acrylic resin (a), a polycarboxylic acid compound curing agent (b) and fine crosslinked resin particles (c).

The thermosetting powder coating composition according to the second aspect of the invention is prepared by a wet process and contains, as raw material, an epoxy-containing acrylic resin (a), a polycarboxylic acid compound curing agent (b) and a resin (d) that exists in the liquid form at room temperature.

Epoxy-Containing Acrylic Resin (a)

The epoxy-containing acrylic resin (a) incorporated in the thermosetting powder coating composition of the present invention is not particularly specified in type, and its specific example is a resin prepared by polymerizing at least one type of epoxy-containing monomer, optionally with other type of monomer that does not undergo a reaction with an epoxy group of the epoxy-containing monomer, according to a conventional procedure. Examples of epoxy-containing monomers include glycidyl (meth)acrylate, 2-methyl glycidyl methacrylate and the like. Examples of optional monomers which do not react with an epoxy group of the epoxy-containing monomer include hydroxyl-containing monomers such as 2-hydroxyethyl (meth)acrylate, 2-hydroxypropyl (meth)acrylate, 4-hydroxybutyl acrylate, addition products (product name: PLAXEL FM Series, manufactured by Daicel Chem. Ind. Co., Ltd.) of 2-hydroxyethyl (meth)acrylate and polycaprolactone and polyalkylene glycol mono(meth)acrylates; and neutral monomers such as methyl (meth)acrylate, ethyl (meth) acrylate, n-butyl (meth)acrylate, isobutyl (meth)acrylate, tert-butyl (meth)acrylate, styrene, vinyl toluene, p-chloro styrene and the like. The above-listed epoxy-containing monomers may be used alone or in any combination thereof. Similarly, the above-listed optional monomers may be used alone or in any combination thereof.

The aforementioned epoxy-containing acrylic resin (a) is preferably present in the solid form at room temperature.

The SP (solubility parameter) value of the epoxy-containing acrylic resin (a) is not particularly specified, but is generally in the range of 9.0–12.0, preferably in the range of 9.0–11.0, more preferably in the range of 9.5–11.0. The SP values can be determined by a method known to those skilled in the art, such as a turbidimetry method.

The Tg (glass transition temperature) of the epoxy-containing acrylic resin (a) is not particularly specified, but is preferably in the range of 20–100° C. Tg's can be determined by a differential scanning calorimeter. Alternatively, Tg's can be calculated from simultaneous equations including a given condition on a ratio of comonomeric units having known Tg's.

The epoxy-containing acrylic resin (a) may comprise one or more types of epoxy-containing acrylic resins. For example, a thermosetting powder coating composition which provides coating films having improved blocking resistance and smoothness can be obtained if the epoxy-containing acrylic resin (a) comprises two different types of epoxy-containing acrylic resins A and B which preferably satisfy the following relationships:

(1) $(SP_A-SP_B)$ is within the range of 0.2–1.5, where $SP_A$=solubility parameter of resin A and $SP_B$=solubility parameter of resin B;

(2) $Tg(A)-Tg(B) \geq 10°$ C., where $Tg(A)$=glass transition temperature of resin A and $Tg(B)$=glass transition temperature of resin B;

(3) $Tg(A)$ is within the range of 40–100° C. and $Tg(B)$ is within the range of 20–50° C.; and (4) A ratio in solids weight of resin A to B is within the range of 5/95–50/50.

The aforementioned resins A and B may or may not be reactive with each other to undergo a curing reaction when heated. Since the thermosetting powder coating composition of the present invention further includes the below-described curing agent, even the resins A and B of the latter case, when heated, are caused to cure via the reaction with the curing agent. This assures sufficient performances of resulting coating films.

If $(SP_A-SP_B)<0.2$, the blocking resistance of the resulting powder coatings may deteriorate during storage. If $(SP_A-SP_B)>1.5$, the resulting powder coatings, when formed into films, may provide the poor appearance.

If $Tg(A)-Tg(B)<10°$ C., the blocking resistance of the resulting powder coatings may deteriorate during storage. As stated above, $Tg(B)$ is preferably within the range of 20–50° C. If $Tg(B)$ is lower than 20° C., the blocking resistance of the resulting powder coatings may deteriorate during storage. On the other hand, if $Tg(B)$ is higher than 50° C., the resulting powder coatings, when formed into films, may provide the poor smoothness.

Also, a number average molecular weight of the resin A is preferably in the range of 2,000–4,000. If it is lower than 2,000, the blocking resistance of the resulting powder coatings may deteriorate during storage. On the other hand, if it is higher than 4,000, the resulting powder coatings, when formed into films, may provide the poor smoothness.

As also stated above, $Tg(A)$ is preferably within the range of 40–100° C. If $Tg(A)$ is lower than 40° C., the blocking resistance of the resulting powder coatings may deteriorate during storage. On the other hand, if $Tg(A)$ is higher than 100° C., the resulting powder coatings, when formed into films, may provide the poor smoothness.

A resin solids of the epoxy-containing acrylic resin (a) for use in the thermosetting powder coating composition generally amounts to 100–1,000 epoxy equivalents. For the further increased performances and physical properties of resulting films, the epoxy equivalent is preferably adjusted to fall within the range of 150–600, more preferably within the range of 200–400.

Polycarboxylic Acid Compound Curing Agent (b)

The thermosetting powder coating composition of the present invention further contains a polycarboxylic acid compound curing agent (b). The polycarboxylic acid compound curing agent (b) preferably exists in the solid form at room temperature. While not particularly specified, a melting point of the polycarboxylic acid compound curing agent (b) is preferably in the range of 60–180° C., more preferably in the range of 80–150° C. If the melting point is lower than 60° C., the storage stability of the resulting powder coatings may deteriorate. If it is higher than 180° C., the resulting powder coatings, when formed into films, may provide the unsatisfactory smoothness and appearance.

Representative of the polycarboxylic acid compound curing agent (b) incorporated in the thermosetting powder coating composition of the present invention are aliphatic polycarboxylic acid compounds and aromatic polycarboxylic acid compounds. Examples of aliphatic polycarboxylic acid compounds include decanedicarboxylic acid, adipic acid, maleic acid, malonic acid, ethylmalonic acid, butylmalonic acid, dimethylmalonic acid, succinic acid, methylsuccinic acid, dimethylsuccinic acid, glutaric acid, methylglutaric acid, dimethylglutaric acid, sebacic acid, azelaic acid, pimelic acid, suberic acid, 1,11-undecanoic acid, dodecane dicarbbxylic acid, brassilic acid, hexadecane carboxylic acid, 3-iso-octylhexane dicarboxylic acid, cyclohexane dicarboxylic acid, butane tricarboxylic acid, butane tetracarboxylic acid, citric acid, tricarballylic acid and the like.

Examples of aromatic polycarboxylic acid compounds include phthalic acid and the like. Anhydrides thereof can also be used, examples of which include succinic anhydride, tetrahydrophthalic anhydride, phthalic anhydride and the like.

Other than the above-described compounds, synthesized polycarboxylic acid compounds can also be used for the polycarboxylic acid compound curing agent (b) of the present invention. Specifically, they may be polycarboxylic acid compounds, for example, obtained via reactions of polyols with acid anhydrides. Examples of such compounds include butanediol succinate prepared from butanediol and succinic anhydride, hexanediol succinate prepared from hexanediol and succinic anhydride, nonanediol succinate prepared from nonanediol and succinic anhydride, 1:1:1 addition product of neopentyl glycol, trimellitic anhydride and succinic anhydride.

For the polycarboxylic acid compound curing agent (b), the above-listed polycarboxylic acid compounds may be used in any combination thereof.

From the viewpoint of film appearance, the polycarboxylic acid compound curing agent (b) may preferably comprise the curing agent composition according to the third aspect of the present invention. That is, the preferred polycarboxylic acid compound curing agent (b) contains a polycarboxylic acid compound (b-1) that exists in the crystalline solid form at room temperature, and a carboxylic acid compound (b-2) dissimilar in type to the polycarboxylic acid compound (b-1), and also satisfies the following conditions:

(1) The polycarboxylic acid compound curing agent (b) exits in the solid form at room temperature; and (2) A melting point of the polycarboxylic acid compound curing agent (b), as determined by a differential scanning calorimeter (hereinafter referred to as DSC), is lower than a melting point of the polycarboxylic acid compound (b-1) or carboxylic acid compound (b-2).

Among the polycarboxylic acid compounds described above as being present in the solid form at room temperature, those which exist in the crystalline solid form at room temperature may be used for the polycarboxylic acid compound (b-1). For the polycarboxylic acid compound (b-1), such polycarboxylic acid compounds may be used in any combination thereof.

The carboxylic acid compound (b-2) dissimilar in type to the above-described polycarboxylic acid compound (b-1) is not particularly specified, and may be chosen, for example, from polycarboxylic acid compounds that exist in the crystalline solid form at room temperature, as referred to in the description of the polycarboxylic acid compound (b-1); polycarboxylic acid compounds that exist in the amorphous solid or liquid form at room temperature; and monocarboxylic acid compounds which do not have a definite form at room temperature. Specific examples of useful carboxylic acid compounds (b-2) may be those which exist in the liquid form at room temperature, including aliphatic monocarboxylic acid compounds such as lauric acid, stearic acid and 8-ethyloctadecanoic acid; 1:2 addition product of nonanediol and hexahydrophthalic anhydride and the like. The above-described carboxylic acid compounds (b-2) may be used in any combination thereof.

A melting point of the polycarboxylic acid compound curing agent (b), which contains the polycarboxylic acid compound (b-1) and carboxylic acid compound (b-2), is not particularly specified. For the better film appearance, it is preferably below a melting point of the polycarboxylic acid compound (b-1) or carboxylic acid compound (b-2). More preferably, it is lower than the respective melting points of the polycarboxylic acid compound (b-1) and carboxylic acid compound (b-2).

For the purposes of this disclosure, respective melting points of the polycarboxylic acid compound curing agent (b), polycarboxylic acid compound (b-1) and carboxylic acid compound (b-2) are given by DSC-determined values. The melting point of a selected compound is determined by the lowest temperature in a temperature range where a DSC curve shows an great heat absorption of the selected compound. In the case where a DSC curve from a certain compound shows a gentle slope only, a temperature at which heat absorption is started is determined as its melting point.

DSC absorption curves from the polycarboxylic acid compound (b-1), carboxylic acid compound (b-2) and polycarboxylic acid compound curing agent (b) are illustrated in FIG. 1. FIG. 1 illustrates a DSC absorption curve from decanedicarboxylic acid, as representing the polycarboxylic acid compound (b-1), a DSC absorption curve from sebacic acid as representing the carboxylic acid compound (b-2), and a DSC absorption curve from the compound which contains decanedicarboxylic acid and sebacic acid in the ratio by weight of 50:50, as representing the polycarboxylic acid compound curing agent (b).

In the present invention, for the above-specified compounds, the melting point of each compound is determined by the lowest temperature in a temperature range where its DSC absorption curve shows an great heat absorption. In the case where a DSC absorption curve for any of those compounds shows a gentle slope only, the temperature at which heat absorption is started is determined as its melting point. For example, the melting point of the polycarboxylic acid compound (b-1) can be determined as 125° C., the melting point of the carboxylic acid compound (b-2) as 130° C., and the melting point of the polycarboxylic acid compound curing agent (b) as 110° C., respectively from the DSC absorption curves depicted in FIG. 1. In the present invention, it is important to find relative relationships between the compounds in terms of a melting point. Accordingly, the values of the determined melting points are permitted to include slight errors, if not significant.

As can be appreciated from illustrative DSC absorption curves depicted in FIG. 1, the DSC absorption curve from the polycarboxylic acid compound curing agent (b) is identical to neither of the DSC absorption curves from its component compounds, i.e., the polycarboxylic acid compound (b-1) and carboxylic acid compound (b-2), and is different from the simple composition of the DSC absorption curves from those two compounds. Also, a melting point of the polycarboxylic acid compound curing agent (b) has been found to be lower than that of at least one of the polycarboxylic acid compound (b-1) and carboxylic acid compound (b-2). These demonstrate that the state of the polycarboxylic acid compound curing agent (b) does not reflect a simple mixture of the polycarboxylic acid compound (b-1) and carboxylic acid compound (b-2). One of the reasons why the polycarboxylic acid compound curing agent (b) exhibits a melting point lower than that of at least one of the polycarboxylic acid compound (b-1) and carboxylic acid compound (b-2) is considered because the higher melting point compound decreases its surface free energy as the lower melting point compound changes its form to a liquid. Another reason would be as follows: As the atomic vibration of the lower melting point compound which has changed its form to a liquid becomes intensive, surface atoms of the higher melting point compound are also caused to vibrate intensively and finally liquefy. This results in lowering a temperature at which the higher melting point compound reaches a critical vibration below which its solid form is maintained.

Unless the DSC-determined melting point of the polycarboxylic acid compound curing agent (b) is lower than that of the polycarboxylic acid compound (b-1) or carboxylic acid compound (b-2), the improvement in appearance of obtaining films may become insufficient.

Preferably, the polycarboxylic acid compound curing agent (b) has a melting point in the range of 60–180° C., and more preferably in the range of 80–150° C. For the better smoothness and appearance of resulting films, it is further preferred that the polycarboxylic acid compound curing agent (b) has a lower melting point relative to the polycarboxylic acid compound (b-1) and carboxylic acid compound (b-2).

The ratio by weight of the polycarboxylic acid compound (b-1) to carboxylic acid compound (b-2), when incorporated in the polycarboxylic acid compound. curing agent (b), is not particularly specified and may be suitably chosen by those skilled in the art. Preferably, it is in the range of 50:50–99:1. If the proportion by weight of the polycarboxylic acid compound (b-1) is below 50, a resulting polycarboxylic acid curing agent compound (b) may fail to take a solid form at room temperature. If it exceeds 99, the improvement in appearance of obtaining films may become insufficient.

A technique used to obtain the polycarboxylic acid compound curing agent (b) preferably involves mixing of the polycarboxylic acid compound (b-1) and carboxylic acid compound (b-2). There are two mixing techniques which can be employed. One technique mixes the polycarboxylic acid compound (b-1) and carboxylic acid compound (b-2) after particle size miniaturization thereof. Another technique mixes them in the liquid form. The latter technique is preferred for its ability to provide a more uniform mixture leading to the improvement in smoothness of resulting films.

Where the former technique is employed, the particle size miniaturization of polycarboxylic acid compound (b-1) and carboxylic acid compound (b-2) is performed such that the resulting mixture, i.e., the polycarboxylic acid compound curing agent (b) has a volume mean particle diameter preferably of not exceeding 15 $\mu$m, more preferably of not exceeding 10 $\mu$m.

Comminuting must be carried out to establish the particle size miniaturization thereof. The comminution can be performed either concurrently with or prior to mixing. Alternatively, preliminary comminuting may be done before the simultaneous practice of final comminuting and mixing. Such comminuting can be achieved by using a conventionally-known means for grinding or pulverizing solids. A mortar may be used, for example. From an industrial point of view, such a means is preferably chosen from comminuting machines generally used in the powder coating art, such as a Henschel mixer and a sand grinding mill, depending upon the end purpose contemplated. The particle size reduction allows the polycarboxylic acid compound (b-1) and carboxylic acid compound (b-2) to be mixed sufficiently. When desired to obtain the polycarboxylic acid compound curing agent (b) in the form of a dispersion, the aforementioned comminuting and mixing may be carried out in the presence of a solvent.

The other technique which involves mixing the compounds in the liquid form can be classified into two modes. Mode one involves allowing the polycarboxylic acid compound (b-1) and carboxylic acid compound (b-2) to melt simultaneously and then cooling to a temperature sufficient to solidify them. Mode two involves allowing the polycarboxylic acid compound (b-1) and carboxylic acid compound (b-2) to dissolve in a suitable solvent and, subsequent to mixing, distilling the solvent off to solidify them. Specific conditions at each stage may be suitably chosen depending upon the particular types of the polycarboxylic acid compound (b-1) and carboxylic acid compound (b-2) used. The solvent suitable for use in dissolving the compounds is not particularly specified. Examples of suitable solvents include aliphatic hydrocarbons such as pentane, hexane and heptane; aromatic hydrocarbons such as benzene, toluene and xylene; alicyclic hydrocarbons such as cyclohexane, methylcyclohexane and decalin; halogenated hydrocarbons such as carbon tetrachloride, chloroform and 1,2-dichloroethane; ethers such as ethyl ether, isopropyl ether, anisole, dioxane and tetrahydrofuran; ketones such as acetone, methyl isobutyl ketone, methyl ethyl ketone, cyclohexanone, acetophenone and isophorone; esters such as ethyl acetate and butyl acetate; petroleum ether and petroleum benzine.

The polycarboxylic acid compound curing agent (b) obtained in the manner as described above is then reduced in size by the aforementioned comminuting means to a volume mean particle diameter preferably of not exceeding 15 $\mu$m, more preferably of not exceeding 10 $\mu$m.

Various methods known to those skilled in the art, such as an electric resistance method and laser light scattering method, can be utilized to determine the volume mean particle diameter.

Fine Crosslinked Resin Particles (c)

The thermosetting powder coating composition according to the first aspect of the present invention contains fine crosslinked resin particles (c), other than the afore-stated epoxy-containing acrylic resin (a) and polycarboxylic acid compound curing agent (b).

Useful fine crosslinked resin particles (c) are known to those skilled in the art. Examples of fine crosslinked resin particles include polymer particles which have intraparticle crosslinking bonds and are insoluble to organic solvents. Such polymer particles can be prepared, for example, by allowing a crosslinkable monomer having two or more free-radically polymerizable, ethylenically unsaturated groups in a molecule, such as ethylene glycol dimethacrylate or divinylbenzene, to polymerize in the presence of an emulsifying agent such as a polyester resin containing amphoteric ionic groups, or alternatively, by allowing an acrylic monomer containing two or more monomer components reactive with each other to form crosslinking bonds, such as a combination of a carboxyl-containing monomer and an epoxy-containing monomer, to polymerize in the presence of an emulsifying agent such as a polyester resin containing amphoteric ionic groups. Also, the fine crosslinked resin particles may comprise so-called core-shell type crosslinked resin fine particles which can be obtained via a two-stage crosslinking reaction.

The fine crosslinked resin particles have a volume mean particle diameter, for example, preferably of 0.01–10 $\mu$m, more preferably of 0.01–5 $\mu$m. However, such a volume mean particle diameter may be suitably selected depending upon the desired volume mean particle diameter of the resulting thermosetting powder coating composition. If the above-described volume mean particle diameter is smaller than 0.01 $\mu$m, the effect of improving a film appearance may become insufficient. On the other hand, if it is larger than 10 $\mu$m, the resulting powder coatings, when formed into films, may provide the poor appearances.

The thermosetting powder coating composition contains the fine crosslinked resin particles (c) preferably in the amount of 0.1–30 parts by weight, more preferably in the amount of 0.1–5 parts by weight, based on 100 parts by weight of the total solids in the aforementioned epoxy-containing acrylic resin (a) and polycarboxylic acid compound curing agent (b). If the amount of fine crosslinked resin particles incorporated falls below 0.1 parts by weight, the effect of improving a film appearance may become insufficient. On the other hand, if it exceeds 30 parts by weight, the resulting powder coatings, when formed into films, may provide the poor appearances.

While not particularly specified, a Tg of fine crosslinked resin particles (c) is preferably between −20° C. and 110° C., more preferably between 0° C. and 110° C. If the Tg is below −20° C., the storage stability of the resulting powder coatings may deteriorate. On the other hand, if the Tg is above 110° C., the resulting powder coatings, when formed into films, may provide the poor smoothness.

Resin (d) that Exists in the Liquid Form at Room Temperature

The thermosetting powder coating composition according to the second aspect of the present invention further contains a resin (d) that exists in the liquid form at room temperature, other than the above-described epoxy-containing acrylic resin (a) and polycarboxylic acid compound curing agent (b). Likewise, the thermosetting powder coating composition according to the first aspect of the present invention may also contain the resin (d) that exists in the liquid form at room temperature, besides the above-described resin (a) and curing agent (b), for the purposes of improving smoothness of resulting films. The "liquid form", as used herein, means the state wherein a substance has a definite volume but does not have a definite configuration. The "liquid form" does not mean the state of a resin solution formed by dissolving a resin in a solvent such as an organic solvent, but means the liquid state of a resin under the substantial absence of a solvent. In the below-described wet process for use in the production of the thermosetting powder coating composition of the present invention, a resin may be used in the form of a resin solution. It should be understood, however, that a solvent, such as an organic solvent, is left substantially unremained in the final thermosetting powder coating composition of the present invention.

The type of the resin (d) that exists in the liquid form at room temperature is not particularly specified. Examples of such resins (d) include a polyester resin, an acrylic resin and other various compounds. The resin (d) can be prepared by techniques known to those skilled in the art, such as polycondensation, free-radical polymerization and the like.

For the increased performances and physical properties of resulting films, it is preferred that the resin (d) that exists in the liquid form at room temperature has a curable group, examples of which include hydroxyl, carboxyl and epoxy groups. The curable group content is not particularly specified, and may be suitably chosen depending upon the availability in industry and handling properties of resins containing such curable groups, and the performances and physical properties desired for the resulting films.

In the case where the resin (d) contains a curable functionality in the form of a hydroxyl group, a hydroxyl value of the resin solids is not particularly specified. In an exemplary case where the resin (d) is a polyester resin, the hydroxyl value is preferably in the range of 30–250, more preferably in the range of 50–200. In another exemplary case where the resin (d) is an acrylic resin, the hydroxyl value is preferably up to 100, more preferably up to 50. The resin (d) may also comprise a polyol compound. In such a case, a hydroxyl value of the resin solid is preferably in the range of 30–300, more preferably in the range of 50–250. Examples of commercial polyol compounds include PLAXEL 410C, PLAXEL 308 and PGL06 (respectively manufactured by Daicel Chem. Ind. Co., Ltd.).

In the case where the resin (d) contains a curable functionality in the form of a carboxyl group, a carboxyl-associated acid value of the resin solids is not particularly specified. In an exemplary case where the resin (d) is a polyester resin, such an acid value is preferably in the range of 1–180, more preferably in the range of 5–80. In another exemplary case where the resin (d) is an acrylic resin, the acid value is preferably up to 100, more preferably up to 50.

In the case where the resin (d) contains a curable functionality in the form of an epoxy group, an epoxy value of the resin solid is not particularly specified. In an exemplary case where the resin (d) is an acrylic resin, the epoxy value is preferably up to 180, more preferably up to 120. The resin (d) may comprise a polyepoxy compound. In such a case, an epoxy value of its solids component is preferably in the range of 20–650, more preferably in the range of 30–200. Examples of polyepoxy compounds include ST1000, ST3000, YH-300, DINACOL EX-301, DINACOL EX-411, DINACOL EX-701, DINACOL EX-212 (respectively manufactured by Tohto Kasei Co., Ltd.); PUE-106, PUE-107, CELLOXIDE 2021 (respectively manufactured by Daicel Chem. Ind. Co., Ltd.); glycidyl esters of hexahydrophthalic anhydride and the like.

Preferably, the resin (d) that exists in the liquid form at room temperature comprises the aforementioned polyester or acrylic resin that exists in the liquid form at room temperature, in considerations of availability in industry and design freedom.

A number average molecular weight of the resin (d) present in the liquid form at room temperature is not particularly specified, but is preferably in the range of 500–5,000 for the improved blocking resistance and smoothness of resulting films. While not particularly specified, Tg of the resin (d) is preferably up to 25° C. for the improved blocking resistance, performances and physical properties of resulting films.

While not particularly specified, an SP value of the resin (d) that exists in the liquid form at room temperature is generally in the range of 9.0–12.0, preferably in the range of 9.0–11.0, more preferably in the range of 9.5–11.0.

In the case where the epoxy-containing acrylic resin (a) in the thermosetting powder coating composition of the present invention contains the aforementioned epoxy-containing acrylic resin A and epoxy-containing acrylic resin B, the resin (d) that exists in the liquid form at room temperature preferably satisfies the following conditions:

(1) $(SP_B - SP_d)$ is within the range of 0.01–1.5, where $SP_d$ is a solubility parameter of resin (d); and (2) The solids component of resin (d) is 5–70 parts by weight, based on 100 parts by weight of the total solids of the aforementioned epoxy-containing acrylic resin (a) and resin (d).

If $(SP_B - SP_d) < 0.01$, the blocking resistance of the resulting powder coatings may deteriorate. If $(SP_B - SP_d) > 1.5$, the resulting powder coatings, when formed into films, may provide the poor appearance.

Also, if the solids weight of the resin (d) is below 5 parts, based on 100 parts of the total solids weight of the aforementioned epoxy-containing acrylic resin (a) and resin (d), the improvement in smoothness of resulting films may become insufficient. If it exceeds 70 parts, the blocking resistance may decrease. Furthermore, the solids weight of resin (d) is preferably 5–50 parts, more preferably 5–20 parts, based on 100 parts of the total solids weight of the aforementioned epoxy-containing acrylic resin (a) and resin (d).

A molar ratio of the carboxyl to epoxy content of the thermosetting powder coating composition of the present invention is preferably in the range of 5/10–11/10, more preferably in the range of 7/10–10/10. If the molar ratio falls outside the above-specified range, the thermosetting powder coating composition may result in the insufficiently hardened films.

Optional Components (e)

The thermosetting powder coating composition of the present invention may further contain a coloring component. In the powder coating, powder particles left uncoated on a substrate are generally recovered for reuse. The reuse of such a recovered powder, however, leads often to color mixing. It is generally preferred that the thermosetting powder coating composition is of clear type. This so-called thermosetting clear powder coating composition contains no coloring component or may contain a coloring component to the extent that does not adversely affect the transparency of the composition. The coloring component may comprise a coloring pigment, dye or the like, for example.

Examples of coloring components include coloring pigments such as titanium dioxide, red iron oxide, yellow iron oxide, carbon black, phthalocyanine pigments, quinacridone pigments and azo pigments; dyes and the like.

Components other than the above-described components, e.g., various additives generally used in the powder coating art can be optionally added to the thermosetting powder coating composition of the present invention.

Such additives include, for example, extender pigments such as talc, silica, calcium carbonate and precipitated barium sulfate; fluidity enhancers such as AEROSIL 130 and AEROSIL 200 (manufactured by Japan Aerosil Co., Ltd.); surface control agents including silicones such as dimethyl silicone and methyl silicone, and acrylic oligomers; antifoaming agents represented by benzoins such as benzoin and benzoin derivatives; curing promoters (or curing catalysts); plasticizers; antistatic agents; UV absorbers; antioxidants; pigment dispersing agents; flame retardants; fluidity enhancers; and curing promoters (or curing catalysts) such as amine compounds, imidazole compounds and cationic polymerization catalysts and the like.

Although not particularly specified, a volume mean particle diameter of the thermosetting powder coating composition of the present invention is generally in the range of 5–40 μm, preferably in the range of 5–30 μm, more preferably in the range of 5–20 μm from the viewpoint of smoothness and appearance of resulting films.

A wet process suitable for use in the preparation of the thermosetting powder coating composition of the present invention include the following steps:

1. A raw material solution is prepared by allowing the above-described raw material to dissolve or disperse in an organic solvent.
2. The raw material solution obtained in step 1 is added to an aqueous solution containing a water-soluble polymer that has a clud point in the 30–90° C. temperature range and mix them at a temperature of below the cloud point to thereby produce a suspension.
3. The suspension obtained in step 2 was heated to a temperature equal to or higher than the cloud point to form secondary oil particles and the organic solvent is distilled off from a system to thereby collect particles. For the purposes of disclosure of the present invention, this type of process shall hereinafter be referred to as a cloud point wet process.

Step 1: Raw Material Solution Preparation

In a first step of the wet process, the above-described raw material is allowed to dissolve or disperse in an organic solvent to thereby prepare a raw material solution. This step is performed regardless of whether the utilization of cloud point of the water-soluble polymer is present or absent. The curing agent composition, which is one component of the raw material, must be maintained in a dispersed form in the raw material solution prepared in this first step. If the curing agent composition is allowed to dissolve completely into the raw material solution, the substantial absence of the curing agent composition results. This leads to the failure to obtain a purposed effect. Preferably, the curing agent composition is finely dispersed to the extent that it does not remain as dust-size particles in the below-described filtering operation.

The epoxy-containing acrylic resin (a) for use as one component of the raw material can be chosen from those described above.

The polycarboxylic acid compound curing agent (b) for use as one component of the raw material can also be chosen from those described above. The polycarboxylic acid compound curing agent (b) may comprise a mixture prepared by mixing the polycarboxylic acid compound (b-1) that exists in the crystalline solid form at room temperature with the carboxylic acid compound (b-2). Preferably, the mixing thereof is achieved sufficiently for the better performances and physical properties of resulting films.

As stated earlier, two techniques can be used to mix those two compounds. One technique involves mixing the two compounds after particle size reduction thereof. Another technique involves mixing them in the liquid form. The latter technique is preferred for its ability to provide a more uniform mixture leading to the improved smoothness of resulting films.

The polycarboxylic acid compound (b-1) and carboxylic acid compound (b-2) may be mixed such that a molar ratio of a carboxyl content of the polycarboxylic acid compound curing agent (b) to an epoxy content of the epoxy-containing acrylic resin (a) falls with the range of 5/10–11/10, preferably within the range of 7/10–10/10.

When needed, other components such as pigments, a variety of additives and the like may be added to the raw material.

The useful organic solvent may show a substantial water immiscibility, i.e., a water-solubility of not exceeding 10%, and have a boiling point of below 100° C. at normal pressure. Alternatively, it may have a tendency to form an azeotropic mixture with water. Specific examples of useful organic solvents include xylene, toluene, cyclohexane, ethyl acetate and the like.

A solids weight of the above-described raw material in the raw material solution is not particularly specified. For example, it may be adjusted to fall within the range of 10–90% by weight, preferably in the range of 30–90% by weight. In the case where the epoxy-containing acrylic resin (a) and/or fine crosslinked resin particles are provided in the form of a liquid dissolved in an organic solvent, an additional supply of an organic solvent is not required if the solids weight of the raw material solution is already within the target range.

When necessary, such organic solvent insolubles as those initially incorporated in the raw material, e.g., dust or foreign matter introduced while the raw material solution is prepared, may be removed by filtration. The filtration can be achieved according to conventional procedures known to those skilled in the art, as by using various types of filters.

Step 2: Suspension Preparation at a Temperature Below a Cloud Point

In a second step of the wet process, the raw material solution obtained in step 1 is added to an aqueous solution containing a water-soluble polymer that has a cloud point in the 30–90° C. temperature range and mix them at a temperature of below the cloud point to thereby prepare a suspension containing primary oil particles.

The water-soluble polymer that has a cloud point in the 30–90° C. temperature range is not particularly specified. Illustrative of such water-soluble polymers are those which, when heated in the form of aqueous solutions, show a cloud point phenomenon in the 30–90° C. temperature range, examples of which include partially saponified polyvinyl alcohol having a saponification value of below 85%; partially formalized compounds; polyvinyl alcohol based polymers containing localized hydrophobic groups such as ethylene-vinyl alcohol copolymer; cellulose derivatives such as methyl cellulose and hydroxypropyl cellulose; polyethylene glycol alkyl ethers; a block copolymer of ethylene glycol and propylene glycol and the like. Besides, water-soluble polymers that do not have inherent cloud points can be made usable by adding thereto suitable electrolytes so that a cloud point phenomenon occurs in the 30–90° C. temperature range. The water-soluble polymers listed above as having cloud points can be used alone or in any combination thereof.

In technical considerations such as particle size control, the use of the aforementioned water-soluble polymer that do not have cloud points is preferred.

The type of the water-soluble polymer that does not have a definite cloud point is not particularly specified. Illustrative of the water-soluble polymers that do not have cloud points are those which, even if heated in the form of their aqueous solutions, do not give rise to a cloud point phenomenon at 100° C. or below, specific examples of which include completely saponified polyvinyl alcohol, partially saponified polyvinyl alcohol having a saponification value of not below 85%, ethyl cellulose, hydroxyethyl cellulose, polyethylene glycol and the like. The above-listed water-soluble polymers that do not have cloud points may be used alone or in any combination thereof. In the case where such a water-soluble polymer that does not have a cloud point is used in combination with the aforementioned water-soluble polymer that has a cloud point in the 30–90° C. temperature range, a ratio in solids weight of the water-soluble polymer that does not have a cloud point to the water-soluble polymer that has a cloud point in the 30–90° C. temperature range is preferably from 99/1 to 10/90. It may be difficult to control particle size of the secondary oil particles which will be described later, when the ratio is the outside of this range.

In this step, the above-described water-soluble polymer that has a cloud point in the 30–90° C. temperature range is first charged, in the form of its aqueous solution, into a reactor equipped with a stirrer. Preferably, the aqueous solution contains the water-soluble polymer in concentration of 0.02–20% by weight. This concentration range better assures the homogeneity of the solution.

The raw material solution obtained in step 1 is then added to the aqueous solution of water-soluble polymer, followed by mixing thereof at a temperature of below the cloud point of the water-soluble polymer. In the case where two or more of water-soluble polymers that have cloud points in the 30–90° C. temperature range are used in combination, the lowest cloud point becomes a controlling parameter. The temperature in the following steps shall be specified by the lowest cloud point of the water-soluble polymers used.

In step 1, each component material may be rendered into its solution. In such a case, individual component material solutions may be separately added to the aqueous solution of water-soluble polymer in step 2. It is however preferred that all the individual component material solutions are mixed together to provide the raw material solution before addition to the aqueous solution of water-soluble polymer. This results in obtaining primary oil particles which contain more uniformly distributed component materials.

The raw material solution is added to the aqueous solution of water-soluble polymer such that a ratio of the weight of the aqueous water-soluble polymer to the solids weight of the raw material solution is preferably maintained within the range of 0.5/1–3/1. This provides a more uniform liquid mixture. The liquid mixture is stirred and diluted with an ion exchange water, if necessary, to finally obtain a suspension containing primary oil particles, with the solids weight of the raw material being in the range of 10–50%. The stirring can be achieved by a stirrer chosen from those known to those skilled in the art depending upon the viscosity of the liquid mixture.

The primary oil particles preferably have a volume mean particle diameter of not exceeding 15 $\mu$m, more preferably of not exceeding 10 $\mu$m. The mean particle diameter of the primary oil particles can be determined by measuring particle diameters of arbitrarily sampled primary oil particles.

As analogously to step 1, organic solvent insolubles, such as dust or foreign matter introduced either prior to or during step 2, may be removed by filtration. Preferably, the filtration is performed at least once before the primary oil particles are solidified in the following step.

Preferably, the organic solvent is partially distilled off in step 2. This serves to improve properties of the resulting thermosetting powder coating composition. The organic solvent can be distilled off if the suspension is maintained at a constant temperature below the cloud point as described above. However, the organic solvent can be distilled off more efficiently if the heat applied to form secondary oil particles in the following step is utilized. In view of the thermosetting nature of the raw material solution, the organic solvent is preferably distilled off at a lower temperature at reduced pressure. In the case where the organic solvent is distilled off by maintaining the suspension at a constant temperature below the cloud point, such a procedure may be carried out so that the amount of the organic solvent remaining in the primary oil particles is reduced to 30% by weight or below, preferably 10% by weight or below, more preferably 5% by weight or below.

Step 3: Formation of Secondary Oil Particles and Particle Collection

In a third step of the wet process, the suspension obtained in step 2 is heated to a temperature equal to or higher than the cloud point to thereby form secondary oil particles and the organic solvent is distilled off to collect particles.

First, the suspension obtained in step 2 is heated to a temperature equal to or higher than the cloud point so that the primary oil particles are caused to agglomerate to form secondary oil particles. The degree of agglomeration is monitored by periodically sampling secondary oil particles for measurement of their particle. sizes. At the point when their particle sizes come to fall within a targeted range, heating may be terminated. The heating conditions may be suitably chosen depending upon the type of the water-soluble polymer used and the nature of the raw material solution.

Two techniques can be utilized to control the particle sizes of secondary oil particles within the targeted range. One technique involves adjusting a weight ratio of the water-soluble polymer that does not have a cloud point to the water-soluble polymer that has a cloud point in the 30–90° C. temperature range. Another technique involves reducing a temperature of the suspension to below the cloud point of the water-soluble polymer when the particle sizes of the secondary oil particles have reached the target range to thereby terminate the further growth of secondary oil particles via agglomeration.

The water-soluble polymer that has a cloud point in the 30–90° C. temperature range is believed to participate in the formation of secondary oil particles as a result of agglomeration of primary oil particles. When the water-soluble polymer that does not have a cloud point is also used in combination therewith, this water-soluble polymer that does not have a cloud point is believed to participate in the particle size control of the primary oil particles.

The removal of the organic solvent results in the solidification of the secondary oil particles. Such a desolvating operation is preferably continued until the complete solidification of the primary oil particles is ascertained.

The organic solvent can be distilled off by the application of heat and/or reduced pressure. In view of the thermosetting nature of particles obtained as a result of solidification, the organic solvent is preferably distilled off at a lower temperature by reducing pressure in the system. Such a desolvating operation is preferably continued until the complete solidification of primary oil particles is ascertained.

The particles obtained as a result of solidification of primary oil particles can be isolated by conventional solid-liquid separation techniques such as filtration and centrifugation.

Such particles, after rinsed with water and dried, finally result in a powder coating composition.

The powder coating composition thus obtained has a volume mean particle diameter in the range of 5–40 $\mu$m, preferably in the range of 5–30 $\mu$m, more preferably in the range of 5–20 $\mu$m.

Other than the cloud point wet process, the wet process which does not utilize the cloud point (may be hereinafter referred to as a non-clouding wet process) can be employed to obtain the thermosetting powder coating composition of the present invention. The thermosetting powder coating composition having the better controlled particle size and the sharper particle size distibution is obtained by utilizing the cloud point wet process relative to utilizing the non-clouding wet process.

Vaious methods known to those skilled in the art, such as an electric resistance method and laser light scattering method, can be utilized to determine a volume mean particle diameter and a number mean particle diameter in the present invention.

In the non-clouding wet process for producing the thermosetting powder coating composition of the present invention, the water-solvent polymer, regardless of whether or not it has a cloud point in the 30–90° C. temperature range, is used in step 1. In the case where the non-clouding water-soluble polymer alone is used, a temperature used in step 2 is not particularly specified. In the other case where the water-soluble polymer which has a cloud point in the 30–90° C. temperature range is present, stirring must be supplied at a temperature of below the cloud point. Furthermore, a third step is omitted and thus no secondary oil particle is formed.

A fluidity enhancer, such as AEROSIL 130 or AEROSIL 200 (manufactured by Japan Aerosil Co., Ltd.) may further be externally added onto particle surfaces of the thermosetting powder coating composition. The use of the fluidity enhancer not only imparts the improved fluidity to the powder coating composition but also improves the blocking resistance. Such a fluidity enhancer can be deposited on surfaces of powder particles by mixing it with the thermosetting powder coating composition.

The thermosetting powder coating composition of the present invention may be applied onto a substrate, as by an electrostatic coating technique, generally to a thickness of 40–80 $\mu$m. The applied composition is then heated to form a coating film. Examples of substrates include surface treated or untreated plastics, iron plate, steel plate, aluminum plate and the like. The heating temperature can be suitably chosen depending upon the particular type of the thermosetting powder coating composition used, but is generally in the range of 100–200° C. The heating period may be suitably adjusted depending upon the heating temperature selected.

Multilayer Film-Forming Method

The multilayer film-forming method of the present invention includes the steps of applying a basecoat onto an undercoated and optionally intercoated substrate, applying the powder coating composition of the present invention onto the basecoat, and heating the substrate carrying thereon the basecoat and powder coating layers.

The substrate for use in the multilayer film-forming method of the present invention is previously undercoated and optionally intercoated. Examples of suitable substrates are listed in the earlier descriptions of the film-forming method. Known coatings, such as primers, electrodeposition coatings and the like, can be used to form the undercoating or intercoating layer.

The type of the basecoat is not particularly specified, and may be a solvent-or water-borne. In considerations of environmental protection, the use of the water-borne base coat is preferred. This base coat is applied onto the undercoated and optionally intercoated substrate, as by an electrostatic spray equipment, to a thickness of 10–20 $\mu$m.

The substrate thus coated with the base coat is preheated at 60–100° C. for about 5–10 minutes, as by exposure to infrared ray or hot air. Subsequently, the thermosetting powder coating composition of the present invention is applied onto the base coat, as by an electrostatic spray coating technique, to a thickness of 40–80 $\mu$m. Heating is then applied at a temperature as appropriate to the thermosetting powder coating composition used. The heating temperature is generally in the range of 100–200° C., preferably in the range of 120–180° C., more preferably in the range of 130–160° C. The heating period can be suitably adjusted depending upon the heating temperature selected, but may be preferably in the range of 5–40 minutes, more preferably in the range of 10–25 minutes.

The practice of the multilayer film-forming method of the present invention thus results in the formation of a multilayer coating film.

DESCRIPTION OF PREFERRED EXAMPLES

The following Examples illustrate the first aspect of the present invention

Preparation Example 1

Preparation of an Emulsifier Containing Amphoionic Groups

A reaction vessel equipped with a stirrer, thermoregulator, reflux tube and decanter was charged with 134 parts by weight of bis(hydroxyethyl) taurine, 130 parts by weight of neopentyl glycol, 236 parts by weight of azelaic acid, 186 parts by weight of phthalic anhydride and 27 parts by weight of xylene. The mixture was then heated under a nitrogen atmosphere and the water produced during the reaction was distilled off as an azeotrope with xylene. After the reflux of xylene was initiated, the temperature of the mixture was gradually raised to 190° C. about 2 hours during which period the reaction was continued so that an acid value of resin solids reached 145. The mixture was then cooled to 140° C. to provide a resin solution.

Then, 314 parts by weight of "CARDURA E10" (monoepoxide manufactured by Shell Chem., Co., Ltd.) was added dropwise to the resin solution over 30 minutes. After successive two hours of stirring, the reaction was terminated to obtain an emulsifier. The emulsifier was found to have a resin solids acid value of 59, a resin solids hydroxyl value of 90 and a number average molecular weight of 1054.

Preparation Example 2

Preparation of an Emulsion 1

Into a reaction vessel equipped with a stirrer, condenser and thermoregulator, 232 parts by weight of deionized water, 15 parts by weigh of the emulsifier obtained in Preparation Example 1 and 0.75 parts by weight of dimethyl ethanolamine were charged and then maintained at 80° C. with stirring to provide a liquid mixture. A solution prepared by dissolving 4.5 parts by weight of azobiscyanovaleric acid into 45 parts by weight of deionized water and 4.3 parts by weight of dimethyl ethanolamine was added to the liquid mixture to prepare an emulsion 1.

Preparation Example 3
Preparation of a Dispersion Containing Fine Crosslinked Resin Particles M-1 and of a Crosslinked Resin Powder M-1'

A liquid mixture of 50 parts by weight of tert-butyl methacrylate and 50 parts by weight of ethylene glycol dimethacrylate was added dropwise to the emulsion 1 obtained in Preparation Example 2 over 1 hour. Thereafter, a solution formed by dissolving 1.5 parts by weight of azobiscyanovaleric acid into 15 parts by weight of deionized water and 1.4 parts by weight of dimethyl ethanolamine was added to the liquid mixture which was subsequently stirred at 80° C. for an additional one hour to prepare an emulsion. This emulsion was then azeotropically distilled to replace the ionized water, as a solvent, with xylene, thereby obtaining a dispersion containing fine crosslinked resin particles M-1. The dispersion of fine crosslinked resin particles M-1 was measured for a volume mean particle diameter and a solids content. The results are given in Table 1. The volume mean particle diameter was determined by using a coulter counter (manufactured by Beckman Coulter Co., Ltd.).

A fraction of the dispersion containing fine crosslinked resin particles M-1 was collected and heated under a reduced pressure to distill xylene off. This resulted in obtaining a crosslinked resin powder M-1' having a solids content by weight of 100%.

Preparation Examples 4–7
Preparation of Dispersions Containing Fine Crosslinked Resin Particles M-2 through M-5

The procedure of Preparation Example 3 was followed, except that the formulations shown in Table 1 were used, to prepare four different dispersions respectively containing fine crosslinked resin particles M-2 through M-5. Each dispersion was measured for a mean volume particle diameter and a solids content in the same manner as in Preparation Example 3. The collected data are given in Table 1.

TABLE 1

| | | Preparation Examples | | | | |
|---|---|---|---|---|---|---|
| | Fine Crosslinked Resin Particles | 3 M1 | 4 M2 | 5 M3 | 6 M4 | 7 M5 |
| Components | Styrene | — | 50 | 40 | 30 | 40 |
| | Methyl Methacrylate | — | — | 10 | 20 | — |
| | n-Butyl Acrylate | — | — | — | — | 20 |
| | tert-Butyl Methacrylate | 50 | — | — | — | — |
| | Ethylene Glycol Dimethacrylate | 50 | 45 | 50 | 50 | 20 |
| | Glycol Dimethacrylate | — | 5 | — | — | 20 |
| | Azobiscyanovaleric Acid | 1.5 | 1.5 | 1.5 | 1.5 | 1.5 |
| | Deionized Water | 15 | 15 | 15 | 15 | 15 |
| | Dimethyl Ethanolamine | 1.4 | 1.4 | 1.4 | 1.4 | 1.4 |
| Measured Values | Volume Mean Particle Diameter (nm) | 53 | 52 | 49 | 70 | 64 |
| | Solids Weight (%) | 20 | 20 | 20 | 20 | 20 |

Preparation Example 8
Preparation of an Emulsion 2

Into a reaction vessel equipped with a stirrer, condenser and thermoregulator, 232 parts by weight of deionized water, 10 parts by weight of the emulsifier obtained in Preparation Example 1 and 0.75 parts by weight of dimethyl ethanolamine were charged and then maintained at 80° C. with stirring to provide a liquid mixture. A solution formed by dissolving 0.2 parts by weight of azobiscyanovaleric acid into 20 parts by weight of deionized water and 0.26 parts by weight of dimethyl ethanolamine was added to the liquid mixture to prepare an emulsion 2.

Preparation Example 9
Preparation of a Dispersion Containing Fine Crosslinked Resin Particles M-6

A first charge of resin materials, i.e., a liquid mixture of 15 parts by weight of styrene, 45 parts by weight of n-butyl acrylate and 40 parts by weight of ethylene glycol dimethacrylate was added dropwise to the emulsion 2 obtained in Preparation Example 2 over one hour, and then maintained at 80° C. with stirring for an additional one hour. A liquid mixture containing 0.8 parts by weight of azobiscyanovaleric acid dissolved in 25 parts by weight of deionized water and 0.3 parts by weight of dimethyl ethanolamine was added. A second charge of resin materials, i.e., a liquid mixture of 15 parts by weight of styrene, 45 parts by weight of n-butyl acrylate and 40 parts by weight of ethylene glycol dimethacrylate was further added dropwise over one hour. Thereafter, a liquid mixture containing 1.5 parts by weight of azobiscyanovaleric acid dissolved in 15 parts by weight of deionized water and 1.4 parts by weight of dimethyl ethanolamine was further added and then maintained at 80° C. with stirring for another one hour to provide an emulsion. This emulsion was then treated in the same manner as in Preparation Example 3 to replace a solvent from the ionized water to xylene, thereby obtaining a dispersion containing fine crosslinked resin particles M-6. The dispersion of fine crosslinked resin particles M-6 was measured for a volume mean particle diameter and a solids content in the same manner as in Preparation Example 3. The results are given in Table 2.

Preparation Example 10
Preparation of a Dispersion Containing Fine Crosslinked Resin Particles M-7

The procedure of Preparation Example 9 was followed, except that the formulation given in Table 2 was used, to prepare a dispersion containing fine crosslinked resin particles M-7. The dispersion containing fine crosslinked resin particles M-7 was measured for a volume mean particle diameter and a solids content in the same manner as in Preparation Example 3. The data collected are shown in Table 2.

TABLE 2

| | Preparation Examples | |
|---|---|---|
| Fine Crosslinked Resin Particles | 9 M6 | 10 M7 |
| 1st Stage Resin Formulations | | |
| Styrene | 15 | — |
| 2-Ethylhexyl Acrylate | — | 40 |
| n-Butyl Acrylate | 45 | — |
| tert-Butyl Methacrylate | — | — |

TABLE 2-continued

|  | Preparation Examples | |
|---|---|---|
| Fine Crosslinked Resin Particles | 9<br>M6 | 10<br>M7 |
| Ethylene Glycol Dimethacrylate | 40 | 60 |
| Azobiscyanovaleric Acid | 0.8 | 0.5 |
| Deionized Water | 25 | 25 |
| Dimethyl Ethanolamine | 0.3 | 0.3 |
| 2nd Stage Resin Formulations | | |
| Styrene | 15 | 60 |
| n-Butyl Acrylate | 45 | — |
| Ethylene Glycol Dimethacrylate | 40 | 40 |
| Azobiscyanovaleric Acid | 0.8 | 0.8 |
| Deionized Water | 15 | 15 |
| Dimethyl Ethanolamine | 1.4 | 1.4 |
| Measured Values | | |
| Volume Mean Particle Diameter (nm) | 77 | 74 |
| Solids Weight (%) | 20 | 20 |

Preparation Example 11

Preparation of a Dispersion Containing a Curing Agent H-1

1,10-decane dicarboxylic acid was dispersed in xylene, and ground by a sand grinding mill to obtain a dispersion containing a curing agent H-1 (solids content by weight of 30%). The volume mean particle diameter of the resulting dispersion was 6 μm when measured by a coulter counter (manufactured by Japan Coulter Co., Ltd.).

Preparation Example 12

Preparation of a Dispersion Containing a Curing Agent Composition H-2

A mixture containing, by weight, 75 parts of 1,10-decane dicarboxylic acid and 25 parts of sebacic acid was dispersed in xylene, and ground by a sand grinding mill to obtain a dispersion containing a curing agent composition H-2 (solids content by weight of 30%). The volume mean particle diameter of the resulting dispersion was measured in the same manner as in Preparation Example 11, which gave the value of 6 μm. Also, a fraction of the resulting dispersion was collected and placed under a reduced pressure to remove xylene therefrom. The melting point of the resultant substance was determined by DSC 220C (differential scanning calorimeter manufactured by Seiko Instrument Ind. Co., Ltd., heating rate of 5° C./min.) which gave the result of 120° C.

Preparation Example 13

Preparation of a Solution Containing an Epoxy-Containing Acrylic Resin R-1

A reaction vessel equipped with a stirrer, thermoregulator and reflux tube was charged with 63 parts by weight of xylene which was subsequently placed under nitrogen atmosphere and heated to a temperature of 130° C. A mixture containing the below-specified components was added dropwise over three hours:

| glycidyl methacrylate: | 45 parts by weight |
|---|---|
| styrene: | 20 parts by weight |
| n-butyl methacrylate | 20 parts by weight |
| isobutyl methacrylate: | 10 parts by weight |
| n-butyl acrylate: | 5 parts by weight |
| tert-butyl peroctoate: | 3 parts by weight. |

After completion of the dropwise addition, the mixture was maintained at 130° C. for additional 3 hours and then cooled to a room temperature to thereby obtain a solution containing an epoxy-containing acrylic resin R-1 (epoxy equivalents of resin solids=180, and solids concentration=60 weight %). Also, a fraction of the resin R-1 solution was heated under a reduced pressure to distill xylene off to provide the resin R-1. Tg of the resulting resin R-1 was determined by DSC 220C (manufactured by Seiko Instrument Ind. Co., Ltd., heating rate of 5° C./min.) which gave the result of 30° C. The measurement according to a turbidimetry method revealed an SP value of 10.2. GPC (gel permeation chromatography) revealed a number average molecular weight of 9,000.

Preparation Examples 14–16

Preparation of Epoxy-Containing Acrylic Resins R-2 through R-4

The procedure of the above Preparation Example 13 was followed, except that the formulations shown in Table 3 were used, to obtain epoxy-containing acrylic resins R-2, R-3 and R-4. These resins obtained were respectively measured for Tg, SP value and number average molecular weight in the same manner as in Preparation Example 13. The measured Tg, SP value and molecular weight for each resin are given in Table 3.

TABLE 3

|  |  | Preparation Examples | | | |
|---|---|---|---|---|---|
|  | Resin | 13<br>R1 | 14<br>R2 | 15<br>R3 | 16<br>R4 |
| Components | Styrene | 20 | 20 | 20 | 20 |
|  | Methyl Methacrylate | — | 27 | — | 20 |
|  | Glycidyl Methacrylate | 45 | 45 | 60 | 60 |
|  | Isobutyl Methacrylate | 10 | 5 | — | — |
|  | 2-Hydroxyethyl Methacrylate | — | 3 | — | — |
|  | n-Butyl Methacrylate | 20 | — | 15 | — |
|  | n-Butyl Acrylate | 5 | — | 5 | — |
|  | t-Butyl Peroctoate | 3 | 10 | 5 | 7 |
| Characteristic Values | Resin Solids Epoxy Equivalent (g/eq) | 180 | 180 | 240 | 240 |
|  | Tg (° C.) | 30 | 70 | 40 | 70 |
|  | SP Value | 10.2 | 10.6 | 10.5 | 10.9 |
|  | Number Average Molecular Weight | 9000 | 3000 | 5000 | 3500 |

EXAMPLE 1

Thermosetting Powder Coating Composition C-1

The components specified below were mixed in a sand grinding mill to prepare a raw material solution.

| Components | Parts by Weight |
| --- | --- |
| epoxy-containing acrylic resin R-1 solution (solids content of 60 wt. %) | 103.3 |
| epoxy-containing acrylic resin R-2 solution (solids content of 60 wt. %) | 25.8 |
| curing agent H-1 dispersion (solids content of 30 wt. %) | 75.0 |
| dispersion of fine crosslinked resin particles M-1 (solids content of 20 wt. %) | 6.0 |
| silicone-based surface conditioning agent | 0.2 |
| acrylic-based surface conditioning agent | 0.1 |
| benzoin | 0.5 |
| UV absorber | 1.0 |
| anti-oxidant | 1.0 |

The raw material solution was then added to an aqueous polymer containing, by weight, 6 parts of GOSENOL GH-20 (polyvinyl alcohol manufactured by Nippon Gosei Kagaku Co., Ltd., saponification level of 88%, no cloud point), 3 parts of GOSENOL KL-05 (polyvinyl alcohol manufactured by Nippon Gosei Kagaku Co., Ltd., saponification level of 80%, cloud point of about 80° C.), 1 part of hydroxypropyl cellulose (cloud point of about 50° C.) and 90 parts of deionized water. A resulting mixture was further mixed at 25° C. by using a homogenizer to prepare a suspension containing primary oil particles. These primary oil particles present in the suspension were measured for a volume mean particle diameter in the same manner as in Preparation Example 3. The results are given in Table 4.

The suspension was diluted by the addition of 300 parts by weight of deionized water, and then transferred to a reaction vessel equipped with a stirrer, thermoregulator, reflux tube and vacuum apparatus.

The suspension was reduced in pressure to 30 Torr. and then heated to 35° C. After a time interval, the suspension was further reduced in pressure to 140 Torr. and then heated to 60° C. to obtain secondary oil particles. Subsequently, a solvent present in a dispersed phase was distilled off completely to solidify the primary oil particles into particles. The resulting suspension was cooled and filtered under suction to collect particles which were subsequently dried at 30° C. under a reduced pressure to obtain a thermosetting powder coating composition C-1. This powder coating composition was measured for a volume mean particle diameter and a number mean particle diameter, as analogously to Preparation Example 9. The measurement results, as well as a ratio of the volume mean to number mean particle diameter, are given in Table 4.

EXAMPLES 2–11
Preparation of Thermosetting Powder Coating Compositions C-2 through C-11

The procedure of Example 1 was followed, except that the formulations shown in Table 4 were used, to obtain thermosetting powder coating compositions C-2 through C-11. In each Example, a volume mean particle diameter of primary oil particles, volume mean and number mean particle diameters of the resulting powder coating composition were measured in the same manner as in Example 1. A ratio of the volume mean to number mean particle diameter was also calculated. The results are given in Table 4.

Comparative Examples 1 and 2
Thermosetting Powder Coating Compositions C-12 and C-13 Prepared in the Absence of Fine Crosslinked Resin Particles The procedure of Example 1 was followed, except that the formulations excluding fine crosslinked resin particles M-1 dispersion as shown in Table 4 were used, to obtain thermosetting powder coating compositions C-12 and C-13. In each Comparative Example, a volume mean particle diameter of primary oil particles, volume mean and number mean particle diameters of the resulting powder coating composition were measured in the same manner as in Example 1. A ratio of the volume mean to number mean particle diameter was also calculated. The results are given in Table 4.

Comparative Example 3
Thermosetting Powder Coating Composition C-14 Prepared with External Addition of Fine Crosslinked Resin Particles The procedure of Example 1 was followed, except that the dispersion of crosslinked resin particles M-1 was not used, to obtain a thermosetting powder coating composition. The resulting coating composition and the fine crosslinked resin particles M-1' obtained in Preparation Example 1, based on the formulation shown in Table 4, were mixed by a Henschel mixer to prepare a thermosetting powder coating composition C-14. A volume mean particle diameter of primary oil particles, volume mean and number mean particle diameters of the resulting powder coating composition were measured in the same manner as in Example 1. A ratio of the volume mean to number mean particle diameter was also calculated. The results are given in Table 4.

Evaluation Tests

The thermosetting powder coating compositions obtained in Examples 1–11 and Comparative Examples 1–3 were evaluated for the following properties.

A. Smoothness

SUPERLAC M260-SILVER (water-borne metallic basecoat manufactured by Nippon Paint Co., Ltd.) was applied onto intercoated substrates by an electrostatic coating technique to a thickness of 10–20 μm, and preheated in a hot-air oven at 145° C. for 25 minutes. After the substrates were cooled to room temperature, each thermosetting powder coating composition was electrostatically applied, in the form of a layer having a thickness of 50 μm, to a set of two substrates. One was set parallel to horizontal and the other at an angle of 60 degrees from horizontal within a hot-air oven and the layers applied thereon were baked at 145° C. for 25 minutes to form coating films. This resulted in obtaining two sample pieces carrying the coating films respectively formed in horizontal and vertical orientations. The resulting sample pieces were taken out from the oven and cooled to room temperature. The coating films respectively formed on horizontally and vertically oriented substrates were evaluated in terms of an NSIC value (%) and an NSIC* value (%) as respectively measured by an image sharpness measuring apparatus (manufactured by Suga testing machine Co., Ltd.). The coating films having an NSIC value of at least 60% and an NSIC* value of at least 35% were rated as being satisfactory.

The aforementioned intercoated substrate was prepared by electrodepositing POWERTOP U-50 (automobile-use cationic electrodeposition coating manufactured by Nippon Paint Co., Ltd.) onto a 100 mm×300 mm×0.8 mm zinc phosphated dull steel plate to a dry thickness of about 25 μm, baking the deposited layer at 160° C. for 30 minutes, electrostatically depositing ORGA P-2 (intercoat composition manufactured by Nippon Paint Co., Ltd.) onto the undercoat to a dry thickness of about 40 μm, and baking the deposited layer at 140° C. for 30 minutes.

B. Occurrence of Sagging

The coating films formed on vertically oriented substrates, as obtained above in evaluating smoothness, were visually observed to evaluate the presence or absence of sagging. The evaluation results are given in Table 4.

under nitrogen atmosphere over three hours. After the dropwise addition, a resulting mixture was maintained at the

TABLE 4

|  |  | Examples | | | | | | | | | | | Comparative Examples | | |
|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 |
|  | Coating | C1 | C2 | C3 | C4 | C5 | C6 | C7 | C8 | C9 | C10 | C11 | C12 | C13 | C14 |
| Coating Formulation | Resin A Solution | R2 | R2 | R2 | R2 | R4 | R4 | R4 | R4 | R4 | R4 | R4 | R2 | R4 | R2 |
|  | (Parts by Weight) | 25.8 | 25.8 | 25.8 | 25.8 | 24.3 | 24.3 | 24.3 | 24.3 | 24.3 | 24.3 | 24.3 | 25.8 | 24.3 | 25.8 |
|  | Resin B Solution | R1 | R1 | R1 | R1 | R3 | R3 | R3 | R3 | R3 | R3 | R3 | R1 | R3 | R1 |
|  | (Parts by Weight) | 103.3 | 103.3 | 103.3 | 103.3 | 97.3 | 97.3 | 97.3 | 97.3 | 97.3 | 97.3 | 97.3 | 103.3 | 97.3 | 103.3 |
|  | Curing Agent Dispersion | H1 | H2 | H2 | H2 | H2 | H2 | H2 | H2 | H2 | H2 | H2 | H2 | H2 | H1 |
|  | (Parts by Weight) | 75.0 | 75.0 | 75.0 | 75.0 | 90.0 | 90.0 | 90.0 | 90.0 | 90.0 | 90.0 | 90.0 | 75.0 | 90.0 | 75.0 |
|  | Dispersion of Fine Crosslinked Resin Particles | M1 | M1 | M1 | M1 | M1 | M2 | M3 | M4 | M5 | M6 | M7 | — | — | M1'*) |
|  | (Parts by Weight) | 6.0 | 6.0 | 12.0 | 1.5 | 6.0 | 6.0 | 6.0 | 6.0 | 6.0 | 6.0 | 6.0 |  |  | 1.2 |
|  | Silicone Surface Conditioning Agent | 0.2 | 0.2 | 0.2 | 0.2 | 0.2 | 0.2 | 0.2 | 0.2 | 0.2 | 0.2 | 0.2 | 0.2 | 0.2 | 0.2 |
|  | Acrylic Surface Conditioning Agent | 0.1 | 0.1 | 0.1 | 0.1 | 0.1 | 0.1 | 0.1 | 0.1 | 0.1 | 0.1 | 0.1 | 0.1 | 0.1 | 0.1 |
|  | UV Absorber | 1.0 | 1.0 | 1.0 | 1.0 | 1.0 | 1.0 | 1.0 | 1.0 | 1.0 | 1.0 | 1.0 | 1.0 | 1.0 | 1.0 |
|  | Anti-Oxidant | 1.0 | 1.0 | 1.0 | 1.0 | 1.0 | 1.0 | 1.0 | 1.0 | 1.0 | 1.0 | 1.0 | 1.0 | 1.0 | 1.0 |
|  | Benzoin | 0.5 | 0.5 | 0.5 | 0.5 | 0.5 | 0.5 | 0.5 | 0.5 | 0.5 | 0.5 | 0.5 | 0.5 | 0.5 | 0.5 |
| Primary Oil Particles | Volume Mean Particle Diameter ($\mu$m) | 4.8 | 5.2 | 3.8 | 4.3 | 5.4 | 4.2 | 4.7 | 4.9 | 5.1 | 3.8 | 4.8 | 5.0 | 5.0 | 4.9 |
| Powder Coating Composition | Volume Mean Particle Diameter ($\mu$m) | 15 | 14 | 18 | 14 | 15 | 16 | 13 | 14 | 13 | 15 | 18 | 17 | 17 | 15 |
|  | Number Mean Particle Diameter ($\mu$m) | 6.2 | 6.4 | 7.3 | 7.0 | 7.2 | 7.3 | 5.9 | 6.0 | 6.2 | 7.1 | 7.0 | 6.3 | 5.9 | 6.2 |
|  | Volume to Number Mean Particle Diameter | 2.4 | 2.2 | 2.5 | 2.0 | 2.1 | 2.2 | 2.2 | 2.3 | 2.1 | 2.1 | 2.6 | 2.7 | 2.9 | 2.4 |
| Appearance | Horizontal NSIC(%) | 63 | 65 | 62 | 69 | 70 | 69 | 65 | 66 | 63 | 65 | 69 | 62 | 71 | 60 |
|  | NSIC*(%) | 41 | 44 | 42 | 46 | 48 | 44 | 46 | 45 | 44 | 44 | 47 | 43 | 49 | 42 |
|  | Vertical NSIC(%) | 61 | 64 | 59 | 63 | 68 | 65 | 64 | 62 | 63 | 61 | 62 | 45 | 49 | 52 |
|  | NSIC*(%) | 39 | 42 | 39 | 40 | 47 | 41 | 45 | 45 | 40 | 42 | 45 | 28 | 32 | 35 |
|  | Sagging | Abs. | Abs. | Abs. | Abs. | Abs. | Abs. | Abs. | Abs. | Abs. | Abs. | Abs. | Pres. | Pres. | Pres. |

*)100 wt. % Solids Content Powder

As can be clearly seen from Table 4, the thermosetting powder coating compositions containing the epoxy-containing acrylic resin (a), polycarboxylic acid compound curing agent (b) and fine crosslinked resin particles (c) provide coating films having satisfactory levels of smoothness both on horizontally and vertically oriented substrates.

The following Examples illustrate the second aspect of the present invention.

Preparation Examples 17–22
Preparation of Epoxy-Containing Acrylic Resins R-5 through R-10

A reaction vessel equipped with a stirrer, thermoregulator and reflux tube was charged with 63 parts by weight of xylene which was subsequently heated to 130° C. In each Example, a mixture containing different monomers in such proportions as indicated in Table 5 was added dropwise same temperature for three hours and then cooled to room temperature. As a result, solutions (solids content of 65 wt. %) were obtained respectively containing epoxy-containing acrylic resins R-5 through R-10. Tg and an epoxy equivalent of resin solids in each resin solution were determined from the formulation indicated in Table 5. For each resin obtained, its SP value and number average molecular weight were determined by a turbidimetry method and GPC (gel permeation chromatography), respectively. The results are given in Table 5.

Further, each resin solution was desolvated under a reduced pressure condition to obtain epoxy-containing acrylic resins R-5 through R-10 (solids content of 100 wt. %). Each resin was visually observed for its form at room temperature. The epoxy-containing acrylic resins R-7 and R-8 were found to be present in the liquid form.

TABLE 5

|  |  | Preparation Examples | | | | | |
|---|---|---|---|---|---|---|---|
|  |  | 17 | 18 | 19 | 20 | 21 | 22 |
|  | Acrylic Resin | R5 | R6 | R7 | R8 | R9 | R10 |
| Components | Styrene | 20 | 20 | 20 | 20 | 20 | 25 |
|  | Methyl Methacrylate | — | 27 | — | — | 8 | 60 |
|  | Glycidyl Methacrylate | 45 | 45 | 30 | 30 | 45 | — |
|  | Isobutyl Methacrylate | 5 | 5 | — | — | — | — |
|  | 2-Hydroxyethyl Methacrylate | — | 3 | — | — | — | 15 |
|  | Isobutyl Methacrylate | — | — | 30 | 50 | — | — |

TABLE 5-continued

|  |  | Preparation Examples | | | | | |
|---|---|---|---|---|---|---|---|
|  |  | 17 | 18 | 19 | 20 | 21 | 22 |
|  | Acrylic Resin | R5 | R6 | R7 | R8 | R9 | R10 |
|  | n-Butyl Methacrylate | 20 | — | — | — | 11 | — |
|  | n-Butyl Acrylate | 5 | — | 20 | — | — | — |
|  | Ethyl Acrylate | — | — | — | — | 16 | — |
|  | t-Butyl Peroctoate | 3 | 10 | 15 | 12 | 3 | 8.5 |
| Characteristic | Resin Solids Epoxy Equivalent (g/eq) | 180 | 180 | 130 | 130 | 180 | — |
| Values | Tg (° C.) | 30 | 70 | −6 | −3 | 40 | 100 |
|  | SP Value | 10.2 | 10.6 | 10.1 | 10.1 | 10.4 | 10.8 |
|  | Number Average Molecular Weight | 9000 | 3000 | 1700 | 2000 | 9000 | 3500 |

Preparation Example 23
Preparation of a Polyester Resin P-1

The components specified below were charged into a reaction vessel equipped with a stirrer, thermoregulator and reflux tube where they were raised in temperature to 220° C. while producing water was removed from a system:

| hexahydrophthalic anhydride: | 267.0 parts by weight |
|---|---|
| ditrimethylolpropane: | 87.0 parts by weight |
| cardura E-10 (monoepoxide manufactured by Shell): | 283.0 parts by weight |
| dibutyltin oxide: | 1.2 parts by weight |

A quantity of the reaction mixture was sampled at proper intervals to measure its acid value by titration with a potassium hydroxide solution. Immediately after the acid value reached 5, the reaction mixture was cooled and then diluted with xylene to obtain a polyester resin P-1 solution (solids content of 65 wt. %). The resin obtained was found to have a final acid value of not exceeding 5. Also, its SP value and number average molecular weight were determined in the same manner as in Preparation Examples 17–22, which gave the values of 10.1 and 2,000, respectively.

Also, the polyester resin P-1 solution was desolvated under a reduced pressure to obtain a polyester resin P-1 (solids content of 100 wt. %). This resin was visually observed for its form at room temperature and found to exist in the liquid form.

Preparation Example 24
Preparation of a Polyester Resin P-2

The components specified below were charged into a reaction vessel equipped with a stirrer, thermoregulator and reflux tube where they were raised in temperature to 220° C. while producing water was removed from a system:

| hexahydrophthalic anhydride: | 24.0 parts by weight |
|---|---|
| trimethylolpropane: | 12.0 parts by weight |
| cardura E-10 | 25.0 parts by weight |
| dibutyltin oxide: | 0.01 parts by weight |

A quantity of the reaction mixture was sampled at proper intervals to measure its acid value by titration with a potassium hydroxide solution. Immediately after the acid value reached 5, the reaction mixture was cooled and then diluted with xylene to obtain a polyester resin P-2 solution (solids content of 65 wt. %). The resin obtained was found to have a final acid value of not exceeding 5. Also, its SP value and number average molecular weight were determined in the same manner as in Preparation Examples 17–22, which gave the values of 10.0 and 1,500, respectively.

Also, the polyester resin P-2 solution was desolvated under a reduced pressure to obtain a polyester resin P-2 (solids content of 100 wt. %). This resin was visually observed for its form at room temperature and found to exist in the liquid form.

Preparation Example 25
Preparation of a Dispersion of a Polycarboxylic Acid Compound Curing Agent Composition H-3

Succinic anhydride was dispersed in xylene, and ground by a sand grinding mill to obtain a dispersion (solids content of 30 wt. %) of a polycarboxylic acid compound curing agent composition H-3. A fraction of the resulting dispersion was collected and placed under a reduced pressure to remove xylene therefrom. The measurement of its volume mean particle diameter by a coulter counter (manufactured by Beckman Coulter Co., Ltd.) gave the result of 6 $\mu$m.

Preparation Example 26
Preparation of a Polycarboxylic Acid Compound Curing Agent Composition H-4 and its Dispersion Succinic anhydride and 1,10-decanedicaboxylic acid, in proportions in solids weight of 1:3, were mixed and comminuted by an ultracentrifugal disperser to obtain a polycarboxylic acid compound curing agent composition H-4. Its volume mean particle diameter was determined in the same manner as in Preparation Example 25, which gave the result of 6 $\mu$m. Also, the resulting curing agent composition H-4 was dispersed in xylene to obtain a dispersion (solids content of 30 wt. %) of polycarboxylic acid compound curing agent composition H-4.

Preparation Example 27
Preparation of a Dispersion of a Polycarboxylic Acid Compound Curing Agent Composition H-5

Tetrahydrophthalic anhydride and 1,10-decanedicaboxylic acid, in proportions in solids weight of 5:1, were mixed and charged into a separable flask where they were caused to melt thermally by heating them under nitrogen atmosphere to 120° C. The melt was then cooled into a solid form which was subsequently dispersed in xylene and ground by a sand grinding mill to provide a dispersion (solids content of 30 wt. %) of a polycarboxylic acid compound curing agent composition H-5. A fraction of the resulting dispersion was collected and placed under a reduced pressure to remove xylene therefrom. Its volume mean particle diameter was determined in the same manner as in Preparation Example 25, which gave the result of 6 $\mu$m.

Preparation Example 28
Preparation of a Dispersion of a Polycarboxylic Acid Compound Curing Agent Composition H-6

The procedure of Preparation Example 27 was followed, with the exception that tetrahydrophthalic anhydride and 1,10-decanedicaboxylic acid was mixed in proportions in solids weight of 6:7, to obtain a dispersion (solids content of 30 wt. %) of a polycarboxylic acid compound curing agent composition H-6. A fraction of the resulting dispersion was collected and placed under a reduced pressure to remove xylene therefrom. Its volume mean particle diameter was determined in the same manner as in Preparation Example 25, which gave the result of 6 μm.

Preparation Example 29
Preparation of a Dispersion of a Polycarboxylic Acid Compound Curing Agent Composition H-7

1,10-decanedicarboxylic acid was dispersed in xylene, and ground by a sand grinding mill to obtain a dispersion (solids contet of 30 wt. %) of a polycarboxylic acid compound curing agent composition H-7. A fraction of the resulting dispersion was collected and placed under a reduced pressure to remove xylene therefrom. Its volume mean particle diameter was determined in the same manner as in Preparation Example 25, which gave the result of 6 μm.

Preparation Example 30
Comminution of Polycarboxylic Acid Compound Curing Agents Succinic anhydride and 1,10-decanedicaboxylic acid were individually comminuted by an ultracentrifugal disperser to obtain a succinic anhydride curing agent H-8 and a 1,10-decane dicaboxylic acid curing agent H-9. The curing agents H-8 and H-9 were determined for volume mean particle diameter in the same manner as in Preparation Example 25, which gave the results of 6 μm, respectively.

EXAMPLE 12
Thermosetting Powder Coating Composition C-15 of the Present Invention The components specified below were mixed in a sand grinding mill to prepare a raw material solution.

| Components | Parts by Weight |
| --- | --- |
| epoxy-containing acrylyc resin R-5 solution (solids content of 65 wt. %) | 38.5 |
| epoxy-containing acrylic resin R-6 solution (solids content of 65 wt. %) | 18.5 |
| polyacarboxylic acid compound curing agent H-3 dispersion (solids content of 30 wt. %) | 43.3 |
| polyester resin P-1 solution (solids content of 65 wt. %) | 76.9 |
| silicone-based surface conditioning agent | 0.2 |
| acrylic-based surface conditioning agent | 0.1 |
| UV absorber | 1.0 |
| anti-oxidant | 1.0 |
| benzoin | 0.5 |

This raw material solution was then added to an aqueous polymer containing, by weight, 6 parts of GOSENOL GH-20 (polyvinyl alcohol manufactured by Nippon Gosei Kagaku Co., Ltd., saponification level of 88%, no cloud point), 3 parts of GOSENOL KL-05 (polyvinyl alcohol manufactured by Nippon Gosei Kagaku Co., Ltd., saponification level of 80%, cloud point of about 80° C.), 1 part of hydroxypropyl cellulose (cloud point of about 50° C.) and 90 parts of deionized water. A resulting mixture was further mixed at 25° C. by using a homogenizer to prepare a suspension. The primary oil particles present in the suspension were measured for a volume mean particle diameter in the same manner as in Preparation Example 25. The results are given in Table 6.

The suspension was diluted with 300 parts by weight of deionized water, and then transferred to a reaction vessel equipped with a stirrer, thermoregulator, reflux tube and vacuum apparatus.

The suspension was reduced in pressure to 30 Torr. and then heated to 35° C. After an interval, the suspension was further reduced in pressure to 140 Torr. and then heated to 60° C. to obtain secondary oil particles. Subsequently, a solvent present in a dispersed phase was distilled off completely to solidify the primary oil particles into particles. The resulting suspension was cooled and filtered under suction to collect particles which were subsequently dried at 30° C. under a reduced pressure to obtain a thermosetting powder coating composition C-15. This powder coating composition C-15 was measured for a volume mean particle diameter in the same manner as in Preparation Example 25. The measurement result is given in Table 6.

EXAMPLES 13–19
Thermosetting Powder Coating Compositions C-16 through C-22 of the Present Invention In each Example, the components specified in Table 6 were mixed in a sand grinding mill to prepare a raw material solution. Otherwise, the procedure of Example 12 was repeated to obtain thermosetting powder coating compositions C-16 through C-22. In each Example, a volume mean particle diameter was determined for the primary oil particles formed in the suspension and for the resulting thermosetting powder coating composition. The results are shown in Table 6.

Comparative Examples 4–7
Thermosetting Powder Coating Compositions C-23 through C-26 Prepared by a Dry Process In each Comparative Example, the components specified in Table 6 were mixed in a Henschel mixer for about 3 minutes and then transferred to a Co-kneader (manufactured by Buss Co., Ltd.) whereby they were melt kneaded at a set temperature of about 95° C. The resulting melt mixture was cooled to room temperature, crushed by a Henschel mixer and reduced in size by a hammer mill and further by a jet mill. The resulting powder was classified by a 200-mesh screen to remove coarse particles therefrom. As a result, comparative thermosetting powder coating compositions C-23 through C-26 were obtained. These coating compositions were measured for volume mean particle diameter in the same manner as in Preparation Example 25. The results are reported in Table 6.

Evaluation Tests

The thermosetting powder coating compositions obtained in Examples 12–19 and Comparative Examples 4–7 were evaluated for performances according to the following procedures.

A. Smoothness

Each thermosetting powder coating composition was deposited electrostatically onto an iron plate and baked at 145° C. for 25 minutes to form a coating film having a thickness of 50 μm. The resulting coating film was measured for center-line average surface roughness (Ra) by using a surface roughness tester (Tokyo Seimitsu Co., Ltd.). The coating films having Ra values of not exceeding 0.30 were rated as being satisfactory. The results are reported in Table 6.

B. Film Appearance

The coating films formed in the above smoothness test were visually evaluated for appearance. The results are given in Table 6. In Table 6, a rating "⊚" indicates an excellent film appearance, a rating "○" indicates a good film appearance, and a rating "x" indicates a poor film appearance such as hazing.

C. Blocking Resistance

Each thermosetting powder coating composition was stored in a 30° C. incubator for 2 weeks and subsequently subjected to sieving with a vibrating 150-mesh screen. The powder coating composition, if a 95% or higher proportion thereof passed through the screen openings, was rated as being satisfactory ("○"). The results are given in Table 6.

TABLE 6

|  |  |  | Examples | | | | | | | | Comparative Examples | | | |
| --- | --- | --- | --- | --- | --- | --- | --- | --- | --- | --- | --- | --- | --- | --- |
|  | Coating | | 12 C15 | 13 C16 | 14 C17 | 15 C18 | 16 C19 | 17 C20 | 18 C21 | 19 C22 | 4 C23 | 5 C24 | 6 C25 | 7 C26 |
| Coating Formulation | Epoxy-Containing Acrylic Resin (a) | Resin A | R6 Solution 38.5 | R6 Solution 38.5 | R6 Solution 38.5 | R6 Solution 80.0 | R10 Solution 65.4 | R10 Solution 23.8 | R6 Solution 23.8 | R6 Solution 23.8 | R6 22.2 | R6 31.2 | R6 9.3 | R6 9.3 |
|  |  | Resin B | R5 Solution 18.5 | R5 Solution 56.9 | R5 Solution 80.0 | R5 Solution 23.8 | R9 Solution 23.8 | R9 Solution 86.9 | R9 Solution 80.0 | R5 Solution 82.0 | R5 Solution 15.0 | R5 15.0 | R5 37.2 | R5 31.2 |
|  | Polycarboxylic Acid Compound Curing Agent (b) | | H3 Dispersion 43.3 | H3 Dispersion 26.7 | H3 Dispersion 10.0 | H4 Dispersion 85.0 | H5 Dispersion 40.0 | H6 Dispersion 43.3 | H7 Dispersion 75.0 | H7 Dispersion 75.0 | H8 8.0 | H8 3.0 | H9 22.5 | H4 25.5 |
|  | Resin (d) Existing in the Liquid Form at Room Temperature | | P1 Solution 76.9 | P1 Solution 46.2 | P1 Solution 15.4 | P1 Solution 15.4 | P2 Solution 46.2 | P2 Solution 23.1 | R7 Solution 15.4 | R8 Solution 15.4 | P1 Solution 46.2 | P1 Solution 15.4 | — | P1 Solution 9.2 |
|  | Silicone Surface Conditioning Agent | | 0.2 | 0.2 | 0.2 | 0.2 | 0.2 | 0.2 | 0.2 | 0.2 | 0.2 | 0.2 | 0.2 | 0.2 |
|  | Acrylic Surface Conditioning Agent | | 0.1 | 0.1 | 0.1 | 0.1 | 0.1 | 0.1 | 0.1 | 0.1 | 0.1 | 0.1 | 0.1 | 0.1 |
|  | UV Absorber | | 1.0 | 1.0 | 1.0 | 1.0 | 1.0 | 1.0 | 1.0 | 1.0 | 1.0 | 1.0 | 1.0 | 1.0 |
|  | Anti-Oxidant | | 1.0 | 1.0 | 1.0 | 1.0 | 1.0 | 1.0 | 1.0 | 1.0 | 1.0 | 1.0 | 1.0 | 1.0 |
|  | Benzoin | | 0.5 | 0.5 | 0.5 | 0.5 | 0.5 | 0.5 | 0.5 | 0.5 | 0.5 | 0.5 | 0.5 | 0.5 |
| Volume Mean Particle Diameter of Primary Oil Particles (μm) | | | 3.8 | 4.1 | 3.9 | 4.2 | 4.2 | 3.8 | 3.7 | 4.0 | — | — | — | — |
| Thermosetting Powder Coating Composition | Volume Mean Particle Diameter (μm) | | 17 | 16 | 15 | 15 | 18 | 20 | 15 | 17 | — | — | 17 | — |
|  | Number Mean Particle Diameter (μm) | | 8.3 | 7.0 | 7.2 | 7.3 | 6.9 | 8.2 | 8.0 | 6.3 | — | — | 3.9 | — |
|  | Volume to Number Mean Particle Diameter | | 2.0 | 2.3 | 2.1 | 2.1 | 2.6 | 2.4 | 1.9 | 2.7 | — | — | 4.4 | — |
| Evaluation Tests | Film Smoothness Ra (μm) | | 0.10 | 0.22 | 0.30 | 0.10 | 0.09 | 0.10 | 0.10 | 0.10 | —*) | —*) | 0.41 | —*) |
|  | Film appearance | | ○ | ○ | ○ | ○ | ◎ | ◎ | ○ | ○ | —*) | —*) | x | —*) |
|  | Blocking Resistance | | ○ | ○ | ○ | ○ | ○ | ○ | ○ | ○ | —*) | —*) | ○ | —*) |

*)Unmeasurable Because of Production Failure

As apparent from the results shown in Table 6, the thermosetting powder coating compositions containing the epoxy-containing acrylic resin (a), polycarboxylic acid compound curing agent (b) and a resin (d) which takes a liquid form at room temperature provide coating films having satisfactory smoothness, film appearance and blocking resistance.

The following Examples illustrate the third aspect of the present invention.

Preparation Example 31

Preparation of an Epoxy-Containing Acrylic Resin R-11

A reaction vessel equipped with a stirrer, thermoregulator and reflux tube was charged with 63 parts by weight of xylene which was subsequently placed under nitrogen atmosphere and heated to a temperature of 130° C. A mixture containing the below-specified components was added dropwise over three hours:

| | |
| --- | --- |
| glycidyl methacrylate: | 45 parts by weight |
| styrene: | 20 parts by weight |
| methyl methacrylate: | 20 parts by weight |
| isobutyl methacrylate: | 10 parts by weight |

-continued

| | |
| --- | --- |
| 2-hydroxyethyl methacrylate: | 5 parts by weight |
| tert-butyl peroctoate: | 7 parts by weight. |

After completion of the dropwise addition, the mixture was held at the same temperature for additional 3 hours and then cooled to a room temperature, so that a solution of an epoxy-containing acrylic resin R-11 (epoxy equivalents of resin solids=180 g/eq, and solids concentration=60 wt. %) was obtained. Also, a fraction of the resin R-11 solution was heated under a reduced pressure to distill xylene off to thereby provide the resin R-11. Tg of the resulting resin R-11 was determined by DSC 220C (differential scanning calorimeter manufactured by Seiko Instrument Ind. Co., Ltd., heating rate of 5° C./min.) which gave the result of 60° C. The measurement according to a turbidimetry method revealed an SP value of 10.6. GPC (gel permeation chromatography) revealed a number average molecular weight of 3,500.

Preparation Examples 32–35

Preparation of Epoxy-Containing Acrylic Resins R-12 through R-15

In each Example, the components specified in Table 7 were mixed. Otherwise, the procedure of Example 31 was repeated to obtain epoxy-containing acrylic resin solutions R-12 through R-15. In each Example, Tg, SP value and number average molecular weight were determined in the same manner as in Preparation Example 31. The results are shown in Table 7.

Preparation Example 36
Comminuted Curing Agent
1,10-decanedicaboxylic acid was comminuted by an ultracentrifugal disperser. The comminuted curing agent was measured for volume mean particle diameter by a coulter counter (Coulter Electronics Co., Ltd.) which gave the result of 6 μm. Also, a melting point of the comminuted curing agent was determined by a DSC 220C ((manufatured by Seiko Instrument Ind. Co., Ltd., heating rate of 5° C./min.) which gave the result of 125° C.

Preparation Example 37
Curing Agent Dispersion
1,10-decanedicarboxylic acid was dispersed in xylene, and ground by a sand grinding mill to obtain a dispersion (solids content of 30 wt. %) wherein one type of curing agent particles were distributed in xylene. Their volume mean particle diameter was determined by a coulter counter (Coulter Electronics Co., Ltd.) which gave the result of 6 μm.

EXAMPLE 20
Curing Agent Composition H-10
A mixture containing, by weight, 50 parts of 1,10-decanedicaboxylic acid and 50 parts of sebacic acid was comminuted by an ultracentrifugal disperser to obtain a curing agent composition H-10. A melting point of the resulting curing agent composition H-1 was determined by a DSC 220C (manufatured by Seiko Instrument Ind. Co., Ltd., heating rate of 5° C./min.) which gave the result of 120° C. Also, its volume mean particle diameter was determined by a coulter counter (Coulter Electronics Co., Ltd.) which gave the result of 6 μm.

EXAMPLE 21
Dispersion of a Curing Agent Composition H-11
A mixture containing, by weight, 50 parts of 1,10-decanedicaboxylic acid and 50 parts of sebacic acid was dispersed in xylene and then ground by a sand grinding mill to obtain a curing agent composition H-11 dispersion (solids content of 30 wt. %). A fraction of the resulting dispersion was collected and placed uner reduced pressure to remove xylene therefrom. The DSC 220C (manufactured by Seiko Instrument Ind. Co., Ltd., heating rate of 5° C/min.) revealed a melting point of 120° C., and the coulter counter (Coulter Electronics Co., Ltd.) revealed a volume mean particle diameter of 6 μm.

EXAMPLE 22
Dispersion of a Curing Agent Composition H-12
50 parts by weight of 1,10-decanedicaboxylic acid and 50 parts by weight of sebacic acid were individually reduced in size by an ultracentrifugal disperser, mixed in a Henschel mixer, dispersed in xylene and ground by a sand grinding mill to obtain a curing agent composition H-12 dispersion (solids content of 30 wt. %). A fraction of the resulting dispersion was collected and placed uner reduced pressure to remove xylene therefrom. The DSC 220C (manufactured by Seiko Instrument Ind. Co., Ltd., heating rate of 5° C./min.) revealed a melting point of 120° C., and the coulter counter (Coulter Electronics Co., Ltd.) revealed a volume mean particle diameter of 6 μm.

EXAMPLE 23
Dispersion of a Curing Agent Composition H-13
A mixture containing, by weight, 50 parts of 1,10-decanedicaboxylic acid and 50 parts of sebacic acid was charged into a separable flask where it was placed under nitrogen atmosphere and thermally melted at 120° C. The melt was cooled into a solid form which was subsequently dispersed in xylene and ground by a sand grinding mill to obtain a curing agent composition H-13 dispersion (solids content of 30 wt. %). A fraction of the resulting dispersion was collected and placed under reduced pressure to remove xylene therefrom. The DSC 220C (manufactured by Seiko Instrument Ind. Co., Ltd., heating rate of 5° C./min.) revealed a melting point of 110° C., and the coulter counter (Coulter Electronics Co., Ltd.) revealed a volume mean particle diameter of 6 μm.

EXAMPLES 24–27
Dispersions of Curing Agent Compositions H-14 through H-17
In each Example, the formulation specified in Table 8 was used. Otherwise, the procedure of Example 22 was followed to obtain dispersions of curing agent compositions H-14 through H-17. Each curing agent composition dispersion was placed under reduced pressure to remove xylene therefrom, and then determined for melting point and volume mean particle diameter in the same manner as in Example 21. The results are given in Table 8. Each curing agent composition was redispersed in xylene to provide dispersions (solids content of 30 wt. %) containing the curing agent compositions H-14, H-15, H-16 and H-17, respectively.

EXAMPLE 28
Thermosetting Powder Coating Composition C-27 Prepared by a Dry Process

| Components | Parts by Weight |
| --- | --- |
| epoxy-containing acrylic resin R-11 | 70 |
| curing agent composition H-10 | 20 |
| YF-3919 (polysiloxane based surface conditioning agent manufactured by Toshiba Silicone Co., Ltd.) | 0.53 |
| benzoin | 0.45 |
| acrylic surface conditioning agent | 0.11 |
| UV absorber | 1.2 |
| hindered amine anti-oxidant | 1.0 |

The above-specified components were blended in a Henschel mixer for about 3 minutes and melt kneaded at a temperature of about 95° C. by a Co-kneader (manufactured by Buss Co., Ltd.). The resulting melt mixture was then cooled to room temperature, crushed by a Henschel mixer and reduced in size by a hammer mill and further by a jet mill. The resulting powder was classified by a 200-mesh screen to remove coarse particles therefrom, thereby obtaining a thermosetting powder coating composition C-27. The coulter counter (Coulter Electronics Co., Ltd.) revealed a volume mean particle diameter of 12.8 μm and a number mean particle diameter of 3.1 μm, resulting in the ratio of 4.1.

Comparative Example 8
Thermosetting Powder Coating Composition C-28 Prepared by a Dry Process
The procedure of Example 28 was followed, except that the curing agent composition H-10 was replaced by the comminuted curing agent obtained in Preparation Example 36, to obtain a comparative thermosetting powder coating composition C-28.

The coulter counter (Coulter Elctronics Co., Ltd.) revealed a volume mean particle diameter of 13.5 µm and a number mean particle diameter of 3.8 µm, resulting in the ratio of 3.6.

EXAMPLE 29
Thermosetting Powder Coating Composition C-29 Prepared by the Wet Process

| Components | Parts by Weight |
|---|---|
| epoxy-containing acrylic resin R-11 solution (resin solids content of 60 wt. %) | 130 |
| curing agent composition H-11 dispersion (solids content of 30 wt. %) | 75 |
| YF-3919 (polysiloxane based surface conditioning agent manufactured by Toshiba Silicone Co., Ltd.) | 0.1 |
| benzoin | 0.3 |
| UV absorber | 1.2 |
| hindered aniine anti-oxidant | 1.0 |

The above-specified components were blended to provide a raw material solution.

This raw material solution was then added to an aqueous polymer containing, by weight, 6 parts of GOSENOL GH-20 (polyvinyl alcohol manufactured by Nippon Gosei Kagaku Co., Ltd., saponification level of 88%, no cloud point), 3 parts of GOSENOL KL-05 (polyvinyl alcohol manufactured by Nippon Gosei Kagaku Co., Ltd., saponification level of 80%, cloud point of about 80° C.), 1 part of hydroxypropyl cellulose (cloud point of about 50° C.) and 90 parts of deionized water. The resulting mixture was further mixed at 25° C. by a homogenizer to prepare a suspension which contained primary oil particles having a volume mean particle diameter of 5.0 µm. The resulting dispersion was diluted with 300 parts by weight of deionized water, and then transferred to a reaction vessel equiepped with a stirrer, thermoregulator, reflux tube and vacuum apparatus.

The suspension was reduced in pressure to 30 Torr. and then heated to 35° C. After a time interval, the suspension was further reduced in pressure to 140 Torr. and then heated to 60° C., whereby secondary oil particles were formed. Next, a solvent present in a dispersed phase was distilled off completely to solidify the primary oil particles into particles. The resulting suspension was cooled and filtered under suction to collect particles which were subsequently dried at 30° C. under a reduced pressure to obtain a thermosetting powder coating composition C-29. The coulter counter (Coulter Electronics Co., Ltd.) revealed a volume mean particle diameter of 12.3 µm and a number mean particle diameter of 7.6 µm, resulting in the ratio of 1.6.

Comparative Example 9
Thermosetting Powder Coating Composition C-30 Prepared by the Wet Process The procedure of Example 29 was followed, except that the curing agent composition H-11 dispersion was replaced by the curing agent dispersion obtained in Preparation Example 37, to obtain a comparative thermosetting powder coating composition C-30. The primary oil particles were found to have a volume mean particle diameter of 3.9 µm. For the resulting powder coating composition, the coulter counter (Coulter Elctronics Co., Ltd.) revealed a volume mean particle diameter of 11.1 µm and a number mean particle diameter of 8.6 µm, resulting in th ratio of 1.3.

EXAMPLES 30–34
Thermosetting Powder Coating Compositions C-31 through C-35 Prepared by the Wet Process The procedure of Example 29 was repeated, except that the curing agent composition H-11 dispersion was replaced by the dispersion of curing agent composition H-13, H-14, H-15, H-16 or H-17, to obtain thermosetting powder coating compositions C-31 through C-35. In each Example, a volume mean particle diameter of the primary oil particles formed, as well as volume and number mean particle diameters of the resulting powder coating composition, were determined in the same manner as in Example 28. The ratio of the volume to number mean particle diameter was also calculated from therefrom. The results are shown in Table 9.

EXAMPLE 35
Thermosetting Powder Coating Composition C-36 Prepared by the Wet Process The procedure of Example 29 was followed, except that 130 parts by weight of the epoxy-containing acrylic resin R-11 solution was altered to a mixture of 100 parts by weight of the epoxy-containing acrylic resin R-12 solution and 30 parts by weight of the epoxy-containing acrylic resin R-13 solution and that the curing agent composition H-11 dispersion was replaced by the curing agent composition H-14 dispersion, to obtain a thermosetting powder coating composition C-36. The primary oil particles produced were determined to have a volume mean particle diameter of 4.5 µm. For the resulting powder coating composition, the coulter counter (Coulter Elctronics Co., Ltd.) revealed a volume mean particle diameter of 9.5 µm and a number mean particle diameter of 6.9 µm, resulting in the ratio of 1.4.

EXAMPLE 36
Thermosetting Powder Coating Composition C-37 Prepared by the Wet Process The procedure of Example 29 was followed, except that 130 parts by weight of the epoxy-containing acrylic resin R-11 solution was altered to a mixture of 70 parts by weight of the epoxy-containing acrylic resin R-14 solution and 60 parts by weight of the epoxy-containing acrylic resin R-15 solution and that the curing agent composition H-11 dispersion was replaced by the curing agent composition H-14 dispersion, to obtain a thermosetting powder coating composition C-37. The primary oil particles produced were determined to have a volume mean particle diameter of 4.1 µm. For the resulting powder coating composition C-37, the coulter counter (Coulter Elctronics Co., Ltd.) revealed a volume mean particle diameter of 11.2 µm and a number mean particle diameter of 8.9 µm, resulting in the ratio of 1.3.

Comparative Example 10
Thermosetting Powder Coating Composition C-38 Prepared by the Wet Process The procedure of Example 35 was followed, except that the curing agent composition H-14 dispersion was replaced by the curing agent dispersion obtained in Preparation Example 37, to obtain a thermosetting powder coating composition C-38. The primary oil particles produced were determined to have a volume mean particle diameter of 4.1 µm. For the resulting powder coating composition, the coulter counter (Coulter Elctronics Co., Ltd.) revealed a volume mean particle diameter of 10.5 µm and a number mean particle diameter of 7.5 µm, resulting in the ratio of 1.4.

Comparative Example 11
Thermosetting Powder Coating Composition C-39 Prepared by the Wet Process The procedure of Example 36 was followed, except that the curing agent composition H-14 dispersion was replaced by the curing agent dispersion obtained in Preparation Example 37, to obtain a thermosetting powder coating composition C-39. The primary oil particles produced were determined to have a volume mean particle diameter of 4.6 µm. For the resulting powder coating composition, the coulter counter (Coulter Elctronics Co., Ltd.) revealed a volume mean particle diameter of 10.3 µm and a number mean particle diameter of 7.5 µm, resulting in the ratio of 1.4.

Table 9 lists the volume mean particle diameters of primary oil particles, the volume mean and number mean particle diameters of thermosetting powder coating compositions and the ratios of the volume to number mean particle diameter, respectively obtained in the above Examples 28–36 and Comparative Examples 8–11.

Evaluation Tests

The thermosetting powder coating compositions obtained in Examples 28–36 and Comparative Examples 8–11 were evaluated for performances according to the following procedures. The results are reported in Table 9.

A. Visual Examination of a Film Appearance

Each thermosetting powder coating composition was applied electrostatically onto an iron plate and baked at 145° C. for 25 minutes to form a coating film having a thickness of 60 µm. The resulting coating film was visually observed for its appearance. In Table 9, the coating film, unless accompanied by a hazing phenomenon, is indicated by a rating of "○", and, if accompanied, by a ratio of "x", B. Smoothness 1) Smoothness of a coating film on an iron plate:

An appearance of the coating film formed on the iron plate in the above. test was evaluated in terms of an NSIC value (%) when determined by an image sharpness measuring apparatus (manufactured by Suga testing machine Co., Ltd.). The coating films having an NSIC value of 65% or higher were rated as being satisfactory.

2) Smoothness of a coating film on a water-borne basecoat:

SUPERLAC M260-SILVER (water-borne metallic basecoat manufactured by Nippon Paint Co., Ltd.) was applied electrostatically on an intercoated substrate to a dry thickness of 10–20 µm, and provisionally heated in a hot-air oven controlled at 80° C. for 10 minutes. After the substrate was cooled to room temperature, each thermosetting powder coating composition was applied electrostatically on the basecoat to a thickness of 50 µm and baked in the hot-air drying oven controlled at 145° C. for 25 minutes. After completion of baking, the substrate was taken out from the oven and left to stand. As the substrate temperature dropped to ambient, the smoothness of the resulting coating film was evaluated in terms of an NSIC value (%) as measured by an image sharpness measuring apparatus (manufactured by Suga testing machine Co., Ltd.). The coating films having an NSIC value of 60% or higher were rated as being satisfactory.

The aforementioned intercoated substrate was prepared by electrodepositing POWERTOP U-50 (automobile-use cationic electrodeposition coating manufactured by Nippon Paint Co., Ltd.) onto a zinc phosphated dull steel plate to a dry thickness of about 25 µm, baking the deposited layer at 160° C. for 30 minutes, electrostatically depositing ORGA P-2 (intercoat composition manufactured by Nippon Paint Co., Ltd.) onto the undercoat to a dry thickness of about 40 µm, and baking the applied layer at 140° C. for 30 minutes.

C. Storage Stability

Each thermosetting powder coating composition was stored in a 30° C. incubator for 2 months and subsequently subjected to sieving with a vibrating 150-mesh screen. The coating composition, if a 95% or higher proportion thereof passed through the screen openings, was found as being satisfactory.

D. Resistance to Solid-Phase Reaction

Each thermosetting powder coating composition was stored in a 30° C. incubator for 2 months, and the rate of its change in weight average molecular weight was determined by GPC. It was also subjected to the above-described smoothness test on an iron plate, and the resulting coating film, if exhibited an NSIC value of 65% or higher, was rated as being satisfactory.

TABLE 7

| | | Preparation Examples | | | | |
|---|---|---|---|---|---|---|
| | | 31 | 32 | 33 | 34 | 35 |
| Epoxy-Containing Acrylic Resin | | R11 | R12 | R13 | R14 | R15 |
| Components | Styrene | 20 | 20 | 20 | 20 | 20 |
| | Methyl Methacrylate | 20 | — | 30 | — | 20 |
| | Glycidyl Methacrylate | 45 | 45 | 45 | 60 | 60 |
| | Isobutyl Methacrylate | 10 | 5 | 5 | — | — |
| | 2-Hydroxyethyl Methacrylate | — | 30 | — | — | — |
| | n-Butyl Methacrylate | — | — | — | 15 | — |
| | n-Butyl Acrylate | — | — | 5 | — | — |
| | t-Butyl Peroctoate | 7 | 3 | 10 | 5 | 7 |
| Characteristic Values | Resin Solids Epoxy Equivalent (g/eq) | 180 | 180 | 180 | 240 | 240 |
| | Tg (° C.) | 60 | 30 | 70 | 40 | 70 |
| | SP Value | 10.6 | 10.0 | 10.4 | 10.5 | 10.9 |
| | Number Average Molecular Weight | 3500 | 9000 | 3000 | 5000 | 3500 |

TABLE 8

|  |  | Examples | | | | | | | Preparation Example |
|---|---|---|---|---|---|---|---|---|---|
|  | Dispersion of Curing Agent Composition | 21 H11 | 22 H12 | 23 H13 | 24 H14 | 25 H15 | 26 H16 | 27 H17 | 36 —*) |
| Components | 1,10-Decane Dicarboxylic Acid | 50 | 50 | 50 | 75 | 75 | 50 | 75 | 100 |
|  | Sebacic Acid | 50 | 50 | 50 | 25 | 20 | — | — | — |
|  | Butane Tricarboxylic Acid | — | — | — | — | 5 | — | 5 | — |
|  | Hexanediol Disuccinate | — | — | — | — | — | 50 | 20 | — |
| Measured Values | Melting Point (° C.) | 120 | 120 | 110 | 110 | 108 | 96 | 95 | 125 |
|  | Volume Mean Particle Diameter ($\mu$m) | 6 | 6 | 6 | 6 | 6 | 6 | 6 | 6 |

*)Comminuted Curing Agent Only
DSC-Determined Melting Points of Components:
M.P. of 1,10-Decane Dicarboxylic Acid = 125° C.
M.P. of Sebacic Acid = 130° C.
M.P. of Butane Tricarboxylic Acid = 119° C.
M.P. of Hexanediol Disuccinate = 101° C.

TABLE 9

|  |  | Examples | | | | | | | | | Comparative Examples | | | |
|---|---|---|---|---|---|---|---|---|---|---|---|---|---|---|
|  |  | 28 | 29 | 30 | 31 | 32 | 33 | 34 | 35 | 36 | 8 | 9 | 10 | 11 |
| Primary Oil Particles | Volume Mean Particle Diameter ($\mu$m) | 12.8 | 5.0 | 4.8 | 4.2 | 3.8 | 4.4 | 4.2 | 4.5 | 4.1 | 13.5 | 3.9 | 4.1 | 4.6 |
| Secondary Oil Particles | Volume Mean Particle Diameter ($\mu$m) | — | 12.3 | 10.3 | 10.1 | 13.0 | 15.0 | 14.4 | 9.5 | 11.2 | — | 11.1 | 10.5 | 10.3 |
| Thermosetting Powder Coating Composition | Volume Mean Particle Diameter ($\mu$m) | 12.8 | 12.3 | 10.3 | 10.1 | 13.0 | 15.0 | 14.4 | 9.5 | 11.2 | 13.5 | 11.1 | 10.5 | 10.3 |
|  | Number Mean Particle Diameter ($\mu$m) | 3.1 | 7.6 | 7.1 | 7.5 | 7.8 | 10.9 | 10.6 | 6.9 | 8.9 | 3.8 | 8.6 | 7.5 | 7.5 |
|  | Volume to Number Mean Particle Diameter | 4.1 | 1.6 | 1.5 | 1.3 | 1.7 | 1.4 | 1.4 | 1.4 | 1.3 | 3.6 | 1.3 | 1.4 | 1.4 |
| Visual Observation |  | ○ | ○ | ○ | ○ | ○ | ○ | ○ | ○ | ○ | x | x | x | x |
| Smoothness (NSIC %) | on an Iron Plate | 70 | 78 | 80 | 75 | 79 | 78 | 75 | 75 | 81 | 52 | 50 | 48 | 49 |
|  | on an Aqueous Basecoat | — | — | — | — | — | — | — | 67 | 63 | — | — | 39 | 40 |
| Storage Stability | Mesh Pass Rate (%) | 30 | 97 | 98 | 98 | 98 | 97 | 98 | 100 | 100 | 38 | 84 | 100 | 100 |
| Solid Reaction Resistance | Mw*) Change Rate (%) | 1.40 | 1.02 | 1.01 | 1.01 | 1.02 | 1.02 | 1.01 | 1.01 | 1.01 | 1.37 | 1.02 | 1.02 | 1.02 |
|  | NSIC (%) | 69 | 76 | 79 | 74 | 78 | 77 | 74 | 74 | 80 | 51 | 49 | 47 | 48 |

*)Weight Average Molecular Weight

The thermosetting powder coating compositions according to the first aspect of the present invention, because of its inclusion of the thermosetting resin, curing agent and fine crosslinked resin particles and its production by the wet process, exhibit improved storage stability and, when applied onto a substrate and heated, result in coating films which show little occurrence of sagging as a result of melt flow of the composition on vertical or curved surface portions of the substrate and which are excellent in smoothness and appearance. This is considered due to the inclusion of fine crosslinked resin particles which, when applied and heated, act on each other to develop a structural viscosity.

The thermosetting powder coating compositions according is to the second aspect of the present invention, because of its inclusion of the epoxy-containing acrylic resin, polycarboxylic acid compound curing agent and resin which exists in the liquid form at room temperature and its production by the wet process, exhibit improved storage stability and can provide coating films excellent in smoothness. This is considered due to the inclusion of the room temperature liquid-form resin which, when applied and heated, serves to reduce a melt viscosity to result in the improved fluidity. Another attributing factor may be the limited application of heat, during production of the coating compositions, which suppresses solid-phase reactions between the formulation components.

In the first and second aspects of the present invention, the incorporation of the particular resins A and B different in type from each other in the aforementioned epoxy-containing acrylic resin further improves the storage stability of coating compositions and smoothness of resulting coating films. During the wet process production of powder coating compositions, the resin A having a higher Tg and SP value is believed to exist at a shell wall of a powder particle surrounded by dispersing water in the increased concentration compared to the resin B, resulting in the increased Tg of the particle shell wall relative to the particle interior. This is considered to have provided the improved blocking resistance to the thermosetting powder coating compositions of the present invention. Also, the overall Tg of the thermosetting powder coating composition is made lower than the Tg of the particle shell walls. This is considered to further improve the smoothness of resulting coating films.

In the particular cases where the polycarboxylic acid compound curing agent includes the two types of compounds and shows the specific behaviors, the resulting coating films have the improved appearance. This is considered due to the increased compatibility of a whole system as a result of the reduced cohesive force of the curing agent. Also, since the melting point of the polycarboxylic acid compound curing agent can be adjusted to lower values, the heating temperature can also be made lower.

The thermosetting powder coating compositions including the curing agent composition according to the third aspect of the present invention result in coating films which present good appearance and show the reduced occurrence of a hazing phenomenon. The use of the curing agent composition of the present invention is considered to decrease the curing agent cohesiveness so that the curing agent composition, when the coating composition is applied and thermally melted, serves to improve the compatibility of a whole system.

Also, the curing agent composition according to the third aspect of the present invention shows a DSC absorption curve different from the curves from pure components, i.e., from the polycarboxylic acid compound (b-1) and carboxylic acid compound (b-2), and, when applied and allowed to thermally melt, exhibits a unique behavior different from that of a simple mixture of the two pure components. This is considered to have led to the improvement in appearance of resulting coating films.

The further improvement in appearance of coating films can be achieved if the curing agent composition is prepared by mixing the polycarboxylic acid compound (b-1) and carboxylic acid compound (b-2), both in the liquid form. This is considered due to the improved cohesion of the resulting curing agent composition. That is, the both compounds are believed to be intermingled more sufficiently on a molecular level when they are mixed in the liquid form than when they are mixed in the conventional form.

For the curing agent composition of the present invention, its melting point can be made lower. With the use of this low-melting curing agent composition, thermosetting powder coatings containing an acid/epoxy curing system can be rendered low-temperature curable.

The thermosetting powder coating composition of the present invention result in a coating film with least occurrence of a hazing phenomenon. This permits high loading of the curing agent composition, leading to the improved crosslinking density of the resulting coating film.

The thermosetting powder coating composition of the present invention has a narrow particle size distribution with particles being uniform in shape. It accordingly contains an extremely small quantity of dust and, when recovered, can be reused like fresh coatings. It also exhibits improved coating operation characteristics such as transportability and transfer efficiency. Furthermore, when applied in the form of a thin film, it results in a smooth coating film.

As a result of using the aforementioned thermosetting powder coating composition, the practice of the multilayer film forming method of the present invention results in the provision of coating films excellent in smoothness. Therefore, the multilayer film forming method of the present invention can be advantageously applied to automotive bodies to provide smooth multilayer films thereon.

What is claimed is:

1. A thermosetting powder coating composition prepared by a wet process, said composition containing a mixture comprising:
    (a) epoxy-containing acrylic resin A and epoxy-containing acrylic resin B, said resins A and B satisfying the properties:
        (1) $(SP_A–SP_B)$ is within the range of from 0.2 to 1.5, wherein $SP_A$ is the solubility parameter of resin A and $SP_B$ is the solubility parameter of resin B;
        (2) $T_g(A)–T_g(B) \geq 10°$ C., wherein $T_g(A)$ is the glass transition temperature of resin A and $T_g(B)$ is the glass transition temperature of resin B;
        (3) $T_g(A)$ is within the range of from 40 to 100° C. and $T_g(B)$ is within the range of from 20 to 50° C.; and
        (4) a solids weight ratio of resin A to resin B is within the range of from 5:95 to 50:50;
    (b) a polycarboxylic acid compound curing agent; and
    (c) fine crosslinked resin particles.
    (d) a resin in liquid form in an amount of from 5–70 parts by solids weight per 100 parts of the total solids weight of epoxy-containing resin (a) and resin (d), wherein $(SP_B–SP_d)$ is within the range of from 0.01 to 1.5, $SP_d$ being the solubility parameter of resin (d);
said wet process comprising the steps of:
    (1) allowing components (a), (b), (c) and (d) to dissolve or disperse in an organic solvent to provide a solution;
    (2) adding said solution to an aqueous solution containing a water-soluble polymer having a cloud point of from 30 to 90° C. and mixing them at a temperature below said could point to provide a suspension containing primary oil particles; and
    (3) heating said suspension to a temperature equal to or higher than the cloud point to form secondary oil particles and distilling off said organic solvent from a system to collect he particles.

2. The thermosetting powder coating composition of claim 1, wherein said organic solvent is distilled off from a system in said step (2).

3. The thermosetting powder coating composition of claim 1, wherein said resin (d) has a number average molecular weight of 200–5,000.

4. The thermosetting powder coating composition of claim 1, wherein said resin (d) is at least one selected from the group consisting of a polyester resin, an acrylic resin, a polyol and a polyepoxy.

5. The thermosetting powder coating composition of claim 1, wherein said resin (d) has a functional group curable with said epoxy-containing acrylic resin (a) or said polycarboxylic acid compound curing agent (b).

6. The thermosetting powder coating composition of claim 1, wherein said thermosetting powder coating composition is a thermosetting powder clear coating composition.

* * * * *